(12) United States Patent
Takabayashi et al.

(10) Patent No.: US 9,046,355 B2
(45) Date of Patent: Jun. 2, 2015

(54) MEASURING APPARATUS, MEASURING METHOD, AND PROGRAM

(75) Inventors: Shiki Takabayashi, Tokyo (JP); Hiroshi Yoshikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 13/387,653

(22) PCT Filed: Jul. 28, 2010

(86) PCT No.: PCT/JP2010/004802
§ 371 (c)(1),
(2), (4) Date: Jan. 27, 2012

(87) PCT Pub. No.: WO2011/013373
PCT Pub. Date: Feb. 3, 2011

(65) Prior Publication Data
US 2012/0133954 A1 May 31, 2012

(30) Foreign Application Priority Data

Jul. 29, 2009 (JP) ................................ 2009-176525

(51) Int. Cl.
*G01B 11/24* (2006.01)
*G01B 11/30* (2006.01)
(Continued)

(52) U.S. Cl.
CPC .......... *G01B 11/2536* (2013.01); *G06T 7/0057* (2013.01)

(58) Field of Classification Search
CPC ....................................... G01B 11/25–11/2545
USPC ........................................................ 356/610
See application file for complete search history.

(56) References Cited

U.S. PATENT DOCUMENTS 4,202,612 A * 5/1980 Di Matteo et al. ............. 356/394
4,259,589 A * 3/1981 DiMatteo et al. ............. 356/610
(Continued)

FOREIGN PATENT DOCUMENTS

CN 101294793 A 10/2008
JP 10-213423 A 8/1998
(Continued)

OTHER PUBLICATIONS

Sato et al., "Liquid Crystal Range Finder—High Speed Range Imaging System Using Liquid Crystal Shutter", The Institute of Electronics, Information and Communication Engineers (IEICE) Transactions, pp. 1249-1257, vol. J71-D, No. 7.
(Continued)

*Primary Examiner* — Michael A Lyons
(74) *Attorney, Agent, or Firm* — Canon USA Inc. IP Division

(57) ABSTRACT

A measuring apparatus includes a projection control unit configured to cause a projection unit to project, onto an object, a first light pattern with light and dark portions, a second light pattern, which is smaller in distance between the light and dark portions than that of the first light pattern and has a boundary position between the light and dark portions common to the first light pattern, and a third light pattern in which the light and dark portions of the second light pattern are reversed to each other, an acquisition unit configured to acquire a first captured image of the object onto which the first light pattern is projected, a second captured image of the object onto which the second light pattern is projected, and a third captured image of the object onto which the third light pattern is projected, and a calculation unit configured to calculate the boundary position between the light and dark portions of the first captured image based on the second and the third captured image to measure the position of the object.

26 Claims, 27 Drawing Sheets

(51) Int. Cl.
*G01B 11/25* (2006.01)
*G06T 7/00* (2006.01)

(56) References Cited

U.S. PATENT DOCUMENTS

| | | | | |
|---|---|---|---|---|
| 4,634,279 | A * | 1/1987 | Ross et al. | 356/610 |
| 4,653,104 | A * | 3/1987 | Tamura | 382/154 |
| 4,846,577 | A * | 7/1989 | Grindon | 356/610 |
| 6,754,370 | B1 * | 6/2004 | Hall-Holt et al. | 382/106 |
| 7,502,125 | B2 * | 3/2009 | Suzuki | 356/604 |
| 7,659,995 | B2 * | 2/2010 | Knighton et al. | 356/608 |
| 7,724,379 | B2 * | 5/2010 | Kawasaki et al. | 356/603 |
| 8,235,534 | B2 * | 8/2012 | Nakayama et al. | 348/807 |
| 2002/0164066 | A1 * | 11/2002 | Matsumoto | 382/154 |
| 2008/0075324 | A1 * | 3/2008 | Sato et al. | 382/106 |
| 2009/0185157 | A1 * | 7/2009 | Imamura | 356/3.01 |

FOREIGN PATENT DOCUMENTS

| | | |
|---|---|---|
| JP | 2006098252 A | 4/2006 |
| JP | 2007309660 A | 11/2007 |

OTHER PUBLICATIONS

Iguchi et al., "Construction of Three Dimensional Image Measurement", 1990, pp. 80-91.

Sato et al., "Liquid Crystal Range Finder—High Speed Range Imaging System Using Liquid Crystal Shutter", The Institute of Electronics, Information and Communication Engineers (IEICE) Transactions, pp. 1249-1257, vol. J71-D, No. 7, 1988.

* cited by examiner

1bit

2bit

MEASURING APPARATUS, MEASURING METHOD, AND PROGRAM

TECHNICAL FIELD

The present invention relates to a measuring apparatus and measuring method for performing measurement based on a captured image of an object onto which patterned light with a light and a dark portion is projected.

BACKGROUND ART

A pattern projection method has been known in which an object, onto which patterned light is projected several times, is captured to measure a shape of the object from a deformation of the pattern using the principle of triangulation. Among others, a spatial coding method, in which a stripe light pattern that a light and a dark portion are alternately arranged at given intervals is projected and space is binary-coded, has been frequently used in a three dimensional measurement.

FIG. 13 illustrates a configuration of an object shape measuring apparatus and a concept of a measuring method using the spatial coding method. In general, the shape measuring apparatus includes a projector 130 for projecting a pattern onto an object to be measured and a camera 131 for capturing a reflected pattern. The projector 130 projects a stripe light pattern that a light and a dark portion are alternately arranged at given intervals onto an object 132. The stripe light pattern has a predetermined plurality of pattern shapes and each of which is projected onto the object 132.

The object 132 onto which the plurality of pattern shapes are projected are captured to acquire image data. In FIG. 13, a boundary position of the light and dark portions of the object 132 is taken as (X,Y, Z). The ray positions of the projector 130 and the camera 131 determined by connecting the boundary position (X, Y, Z) to the projector 130 and the camera 131 are taken as (X1, Y1) and (X2, Y2) respectively.

The ray position of the camera 131 (X2, Y2) can be determined by the horizontal coordinate of an image sensor (a CCD sensor or a CMOS sensor) of the camera 131. The horizontal coordinate is determined by a horizontal and a vertical width of the image sensor. A 640*480 pixel image sensor, for example, the x coordinate in the horizontal direction has values of 0 to 640 and the y coordinate in the vertical direction has values of 0 to 480.

The ray position of the projector 130 (X1, Y1) can be similarly determined by the horizontal coordinate of a light projecting sensor (a CCD sensor or a CMOS sensor). A base length L between the projector 130 and the camera 131 is determined from the configurative conditions of the apparatus. The boundary position (X, Y, Z) of the object 132 can be determined from these parameters using the principle of triangulation. Determining the boundary positions (X, Y, Z) on all over the object 132 allows measuring the three dimensional shape of the object 132.

The shape of the stripe light pattern used for measurement is described below. FIGS. 14A, 14B, and 14C illustrate binary coded stripe light pattern in which a light and a dark portion are alternately arranged at equal intervals. A black portion of a reflective pattern corresponds to zero, and a white portion thereof corresponds to one.

In FIG. 14A, the whole area is divided into two portions and two areas are coded as 1 and 0. In FIG. 14B, each of the halved areas is further halved and four areas are coded as 1, 0, 1, and 0. The corresponding stripe light pattern is projected and captured.

In FIG. 14C, each of the quadrant areas is halved and eight areas are coded as 1, 0, 1, 0, 1, 0, 1, and 0. The corresponding stripe light pattern is projected and captured. Thus, each area is provided with a coded area number to allow each area to be determined.

In FIGS. 14A, 14B, and 14C, each area can be determined as (1, 1, 1), (1, 1, 0), (1, 0, 1), (1, 0, 0), (0, 1, 1), (0, 1, 0), (0, 0, 1), and (0, 0, 0). This is referred to as space coding by three bits. When a shape is measured in detail, n stripe light patterns are projected while areas are sequentially being halved, and area numbers in which areas onto which the projector projects stripe light patterns are divided into $2^n$ (the n power of 2) are provided to allow each area to be determined. In a general three dimensional measurement, an 8- or a 9-bit coding is performed.

In FIG. 14C, the light and dark portions are the smallest in width. The stripe light pattern is referred to as an LSB pattern light. The width of the light and dark portions is referred to as the minimum width. The size of the minimum width can be determined based on the horizontal width W and the bit number of the image sensor. In the spatial coding by N bit, the minimum width=$W/(2^n)$.

The spatial coding can use a binary code called a gray code with a coding error resilience instead of a simple binary code in FIGS. 14A, 14B, and 14C. FIGS. 15A, 15B, and 15C illustrate gray codes. In FIG. 15A, two areas are coded as 1 and 0. In FIG. 15B, four divided areas are coded as 1, 0, 0, and 1. In FIG. 15C, eight divided areas are coded as 1, 0, 0, 1, 1, 0, 0, and 1.

Even in the gray code, the concept of the minimum width is similarly obtained as the minimum width=$W/(2^n)$. The use of the gray code does not cause a coding error in a global area even if a coding error occurs in the boundary between areas due to displacement or blur of a spatial coding pattern. In general, the spatial coding method uses the gray code.

It is necessary to accurately determine a horizontal x-coordinate position (hereinafter referred to as a boundary position) between the light and dark portions from the captured image data to improve accuracy in the three dimensional measurement of the spatial coding method. FIGS. 16A and 16B are charts describing the boundary position between the light and dark portions. FIGS. 16B and 16C are graphs illustrating the luminance of the captured image data and the horizontal coordinate x.

FIG. 16A illustrates an idealistic boundary position. In FIG. 16A, the boundary position between the light and dark portions is uniquely determined and positions "a" and "b" are determined as boundary positions. In an actual measurement, however, as illustrated in FIG. 16B, a gentle straight line is formed in the vicinity of boundary positions due to blur of the spatial coding pattern, reflectance ratio of an object, and influence of external light, which makes it difficult to uniquely determine boundary positions.

A method for determining the abovementioned boundary position is discussed in Non-Patent Literature 1 (Seishi Iguchi and Kousuke Sato, "Three Dimensional Image Measurement," pp. 80 to 91, Shokodo, 1990) and Non-Patent Literature 2 (The Institute of Electronics, Information and Communication Engineers (IEICE) TRANSACTIONS, D Vol. J71-D, No. 7, pp. 1249 to 1257).

FIGS. 17A and 17B illustrate an average image comparison method, which is one of methods for determining the abovementioned boundary position. FIG. 17A illustrates stripe light pattern to be projected. The stripe light pattern 20 is the light pattern spatially coded by a 3-bit gray code. A whole illumination pattern 23 only with a light portion and a whole blackout pattern 24 only with a dark portion are prepared as pattern light. The five different stripe light patterns are projected onto an object, and the object onto which the stripe light patterns are projected is captured.

FIG. 17B is a graph illustrating a relationship between the luminance of the captured image data and the horizontal coordinate x. A luminance line 173 is the luminance line in the vicinity of boundary position of image data captured using any of the stripe light pattern 20. A luminance line 174 is the luminance line of image data captured using the whole illumination pattern 23. A luminance line 175 is the luminance line of image data captured using the whole blackout pattern 24.

The luminance lines 174 and 175 are averaged to obtain an average as a luminance line 176. The luminance line 173 of the stripe light pattern 20 and the luminance line 176 of the average intersect with each other at a position "a". The position "a" determined by the above process is taken as a boundary position. What is described above is the average image comparison method.

FIGS. 18A and 18B illustrate a complementary pattern projection method, which is one of methods for determining the abovementioned boundary position. FIG. 18A illustrates stripe light pattern to be projected. The stripe light pattern 20 is the stripe light pattern spatially coded by a 3-bit gray code. A stripe light pattern 180 is the stripe light pattern in which the light and dark portions of the stripe light pattern 20 are reversed. The six different stripe light patterns are projected onto an object, and the object onto which the stripe light patterns are projected is captured.

FIG. 18B is a graph illustrating a relationship between the luminance of the captured image data and the horizontal coordinate x. A luminance line 181 is the luminance line in the vicinity of boundary position of image data captured using any of the stripe light pattern 20.

A luminance line 182 is the luminance line of image data captured using a reversion pattern light. A relative position on the horizontal coordinate of the luminance line 182 is set as similar to the relative position of the luminance line 181. The luminance lines 181 and 182 intersect with each other at a position "b". The position "b" determined by the above process is taken as a boundary position. What is described above is the complementary pattern projection method.

The number of patterns required for the two methods are at least 2N in the complementary pattern projection method and (N+2) in the average image comparison method, at an N-bit spatial coding. When N=1, the number of the patterns required for the average image comparison method is greater by one than that for the complementary pattern projection method. When N is greater than 1, the number of the patterns required for the complementary pattern projection method is greater than that for the average image comparison method.

Actually, at N=1, only two areas are coded not to allow the three dimensional measurement to be performed, so that, in general, the number of the patterns to be captured for the complementary pattern projection method becomes greater than that for the average image comparison method. The two methods are described using the stripe light pattern of the gray code. The same holds true for the binary code illustrated in FIGS. 14A, 14B, and 14C. When the spatial coding method is used, the boundary position between the light and dark portions is determined in general using any of the above methods.

The advantage and the disadvantage of the two methods described above are summarized below. In the complementary pattern projection method, two images projected onto an object are used to allow canceling influence due to the shape and the reflectance ratio of the object. For this reason, the complementary pattern projection method can more accurately determine the boundary position than the average image comparison method.

However, in general, the number of the patterns to be projected for the complementary pattern projection method is greater than that for the average image comparison method. Particularly, in the three dimensional measurement, measurement is performed generally in higher bits of 8 bits or 9 bits to double the number of the patterns to be projected, increasing a measuring time period. On the other hand, the number of the patterns to be projected for the average image comparison method is smaller than that for the complementary pattern projection method to enable reducing a measuring time period. However, the average image comparison method more probably produces errors than the complementary pattern projection method in calculating the boundary position.

For example, the boundary position is determined by the average between the whole illumination pattern and the whole blackout pattern to produce errors owing to influence due to the shape and the reflectance ratio of the object. Furthermore, the boundary position is determined based upon the average, so that it is not always reasonable.

In an actual measurement, the complementary pattern projection method and the average image comparison method are different in boundary positions by several pixels, which can extend on the order of millimeters. As described above, it is difficult for conventional technique to accurately and quickly determine the boundary position between the light and dark portions.

CITATION LIST

Non Patent Literature

NPL 1: Seishi Iguchi and Kousuke Sato, "Three Dimensional Image Measurement," pp. 80 to 91, Shokodo, 1990

NPL 2: The Institute of Electronics, Information and Communication Engineers (IEICE) TRANSACTIONS, D Vol. J71-D, No. 7, pp. 1249 to 1257

SUMMARY OF INVENTION

The present invention is directed to a measuring apparatus, a measuring method and a program capable of accurately and quickly measuring the position of an object based on the captured image of the object onto which pattern light is projected.

According to an aspect of the present invention, a measuring apparatus includes a projection control unit configured to cause a projection unit to project, onto an object, a first light pattern with light and dark portions, a second light pattern, which is smaller in distance between the light and dark portions than that of the first light pattern and has a boundary position between the light and dark portions common to the first light pattern, and a third light pattern in which the light and dark portions of the second light pattern are reversed to each other, an acquisition unit configured to acquire a first captured image of the object onto which the first light pattern is projected, a second captured image of the object onto which the second light pattern is projected, and a third captured image of the object onto which the third light pattern is projected, and a calculation unit configured to calculate the boundary position between the light and dark portions of the first captured image based on the second and the third captured image to measure the position of the object.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Example 1

Various exemplary embodiments, features, and aspects of the invention will be described in detail below with reference to the drawings.

Figure 1:
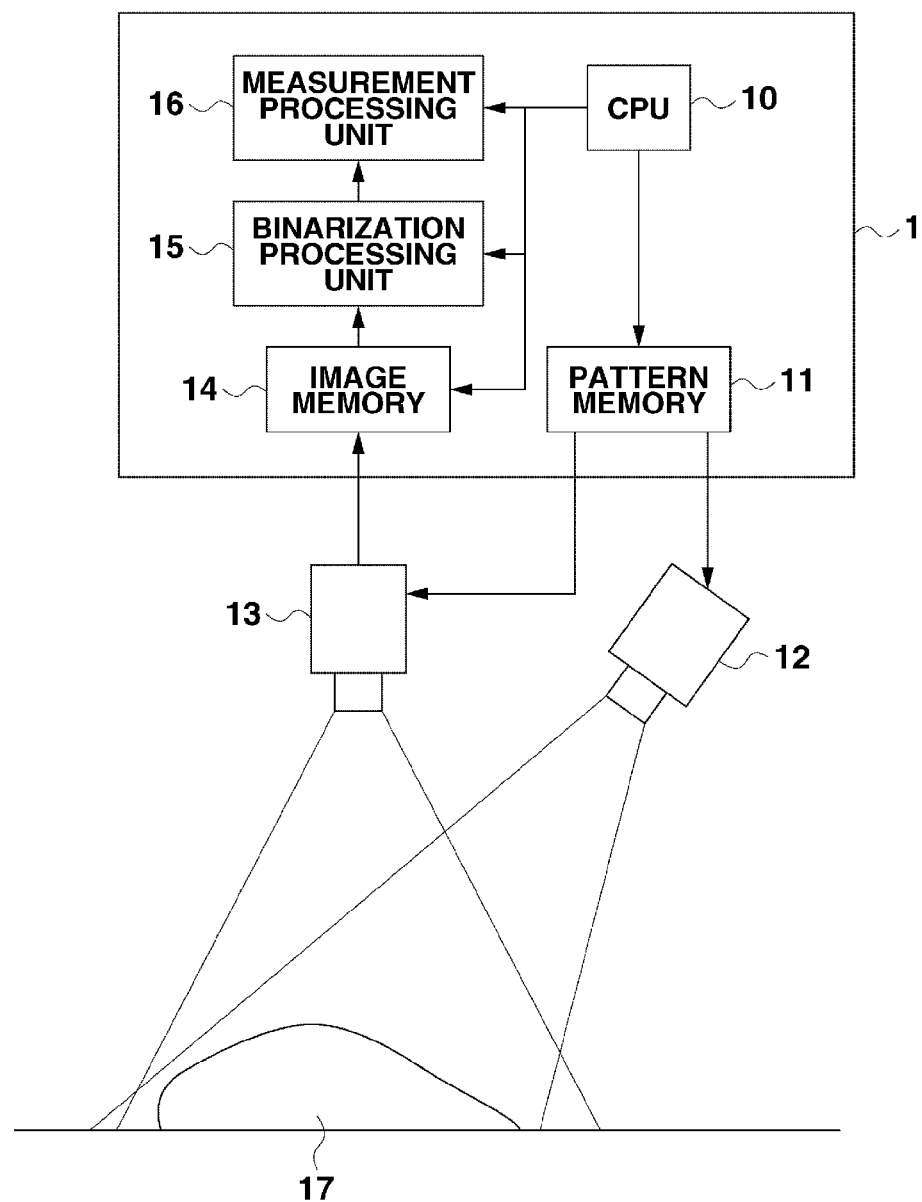
FIG. 1 illustrates a basic configuration of a measuring apparatus according to a first exemplary embodiment.

FIG. 1 illustrates a basic configuration of a measuring apparatus for carrying out a measuring method according to the present exemplary embodiment.

The present exemplary embodiment basically includes a projector 12 capable of projecting the stripe light pattern onto an object 17, a camera 13 for capturing the object 17 onto which the stripe light pattern is projected, and a calculation processing unit 1 for issuing instructions to project and capture the stripe light pattern and calculating the captured image data to perform the three dimensional measurement.

The calculation processing unit 1 includes a central processing unit (CPU) 10, a pattern memory 11, an image memory 14, a binarization processing unit 15, and a measurement processing unit 16. The above components are connected to one another via a bus and can transmit and receive a command and data to and from one another.

The pattern memory 11 is formed of a storage unit such as a ROM. The pattern memory 11 stores a pattern shape program for the stripe light pattern and a time account program for setting a projection time period. The pattern memory 11 that is instructed by the CPU 10 to perform projection transmits a stripe light pattern shape signal to the projector 12. The CPU 10 functions as a projection control unit for causing the projector 12 to act as a projection unit.

A time account signal is transmitted to the projector 12 and the camera 13 to manage the timing of projecting and capturing the stripe light pattern. The camera 13 functions as an acquisition unit for acquiring a captured image.

Image data (captured image) captured by the camera 13 is temporarily stored in the image memory 14 and sequentially transmitted to the binarization processing unit 15. The binarization processing unit 15 includes storage units such as a ROM and a RAM, and determines the boundary position between the light and dark portions of the stripe light pattern. The binarization processing unit 15 determines the boundary position, and then generates monochrome binary image data.

The binarization processing unit 15 stores a binarization processing program for determining the boundary position. When spatial coding is performed by N bits, the stripe light pattern is formed into N types of pattern shapes, which produces N binary image data.

The binary image data generated by the binarization processing unit 15 is transmitted to the measurement processing unit 16. The measurement processing unit 16 includes storage units such as a ROM and a RAM and a processing unit. The storage unit of the measurement processing unit 16 stores parameters that differ depending on the apparatus such as the base length, focal length, and the number of pixels of the projector 12 and the camera 13. The storage unit also stores external parameters such as distortion due to previously performed calibration and luminance of external light. The storage unit further stores a three-dimensional measurement program used for triangulation.

The measurement processing unit 16 performs processing based on the three-dimensional measurement program using the binary data and various parameters. The measurement result is generated as distance image data. The distance image data is converted into an image signal by an output unit and can be observed as a distance image on a display unit such as a monitor.

All of the processing in the image memory 14, the binarization processing unit 15, and the measurement processing unit 16 are performed based on the instructions from the CPU 10. A part of the functions of the calculation processing unit 1 can be substituted with a personal computer having a storage unit storing a computer program, and a CPU.

The stripe light pattern to be projected is described below. In the present exemplary embodiment, spatial coding using a gray code pattern will be described as an example, however, even in the case of a simple binary code, the following description is similar to that of the above example.

Figure 2:
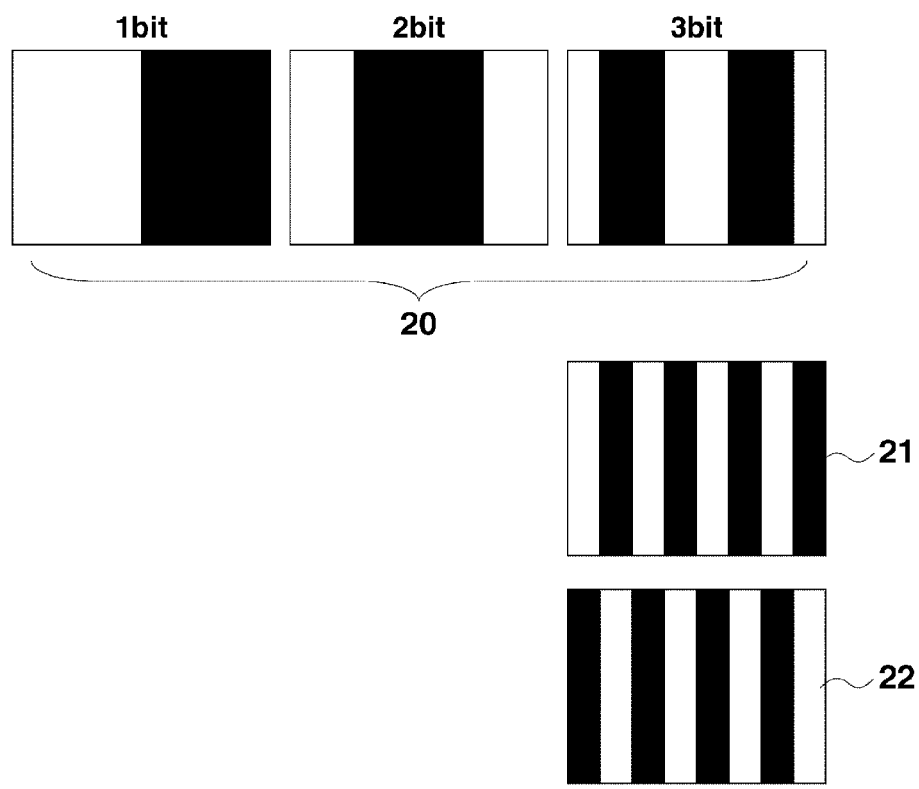
FIG. 2 illustrates a stripe light pattern to be projected according to the first exemplary embodiment.

FIG. 2 illustrates the stripe light pattern to be projected. A stripe light pattern 20 is the stripe light pattern spatially coded by a 3-bit gray code. In the present exemplary embodiment, spatial coding using a 3-bit gray code will be described as an example, in the case of N-bit spatial coding, the number of captured images by the stripe light pattern 20 equals to N.

A binary coded light pattern 21 is the light pattern which is equivalent in width to the LSB pattern of the stripe light pattern 20 (or, 3rd bit of the stripe light pattern 20). A reversed binary coded light pattern 22 is a binary coded light pattern in which the binary coded light pattern 21 is reversed. The five different stripe light patterns described above are projected from the projector 12 onto the object 17.

Figure 3A:
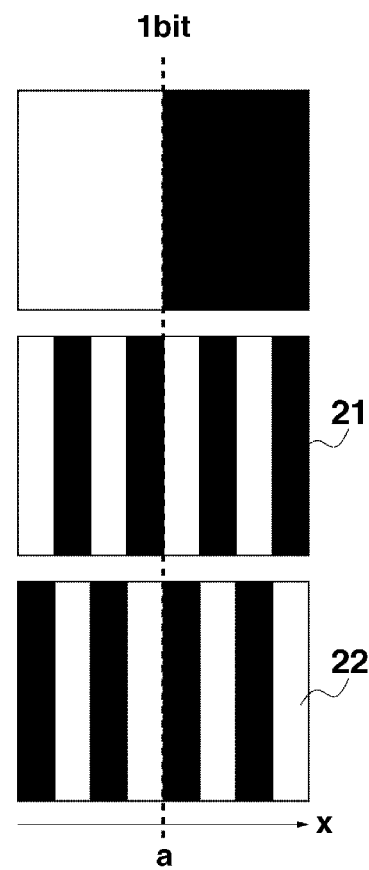
FIG. 3A illustrates the principle for determining a boundary position according to the first exemplary embodiment.
Figure 3B:
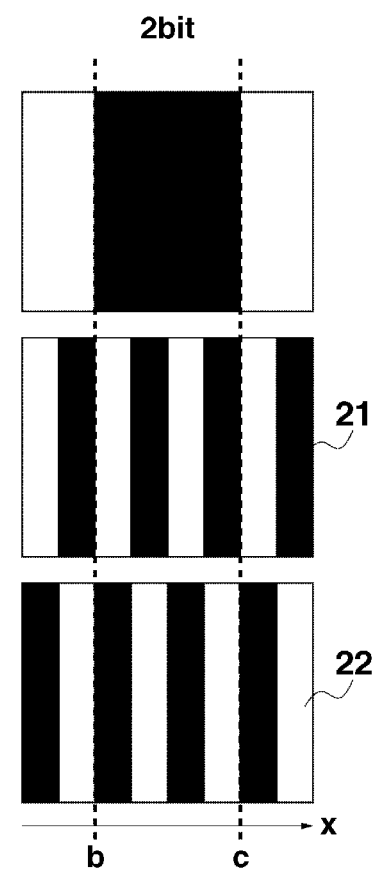
FIG. 3B illustrates the principle for determining a boundary position according to the first exemplary embodiment.
Figure 3C:
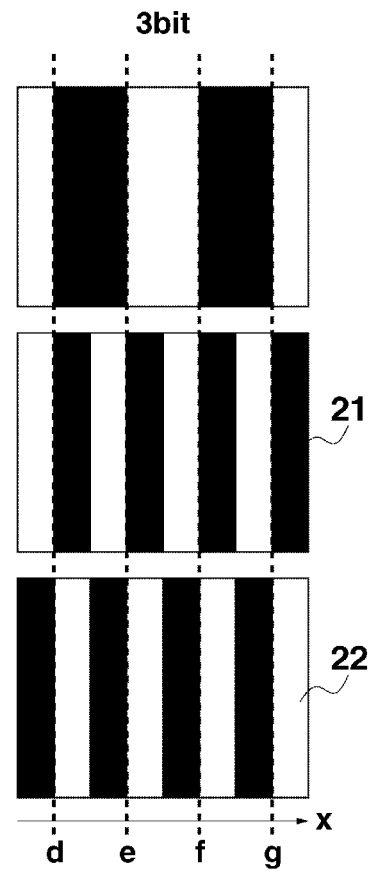
FIG. 3C illustrates the principle for determining a boundary position according to the first exemplary embodiment.

FIGS. 3A, 3B, and 3C schematically illustrate the principle for determining a boundary position using the binary coded light pattern 21 and the reversed binary coded light pattern 22.

FIG. 3A illustrates the 1st bit stripe light pattern 20, the binary coded light pattern 21, and the reversed binary coded light pattern 22.

The boundary position between the light and dark portions in a position "a" of the horizontal coordinate of the binary coded light pattern 21 and the reversed binary coded light pattern 22 corresponds to the boundary position between the light and dark portions in the 1st bit stripe light pattern 20. Therefore, a boundary position can be obtained from the boundary position determined between the light and dark portions from the relationship between the 1st bit stripe pattern 20 and the binary coded light pattern 21 and the reversed binary coded light pattern 22.

FIG. 3B illustrates the 2nd bit stripe light pattern 20, the binary coded light pattern 21, and the reversed binary coded light pattern 22. Paying attention to the correspondence to the boundary position similar to the above, the boundary position between the light and dark portions in positions "b" and "c" of the binary coded light pattern 21 and the reversed binary coded light pattern 22 is common to the boundary position between the light and dark portions in the 2nd bit stripe light pattern 20.

FIG. 3C illustrates the 3rd bit stripe light pattern 20, the binary coded light pattern 21, and the reversed binary coded light pattern 22. Paying attention to the correspondence to the boundary position similarly to the above, the boundary position between the light and dark portions in positions "d," "e," "f," and "g" of the binary coded light pattern 21 and the reversed binary coded light pattern 22 is common to the boundary position between the light and dark portions in the 3rd bit stripe light pattern 20.

More specifically, the boundary position of a first captured image of a first light pattern (the light pattern 20) can be calculated based on a second captured image of a second light pattern (the binary coded light pattern 21) and a third captured image of a third light pattern (the reversed binary coded light pattern 22).

Thus, in the 3-bit spatial coding, the boundary position of the stripe light pattern 20 is included in the binary coded light pattern 21 and the reversed binary coded light pattern 22 to allow determining the boundary position from the two image data. Theoretically, also in an N-bit spatial coding, a binary coded light pattern, whose widths are equal to or shorter than the minimum width, and its reversed binary coded light pattern are used to enable determining the boundary position.

In the present exemplary embodiment, it is possible to determine the boundary position in the N-bit spatial coding using (N+2) captured images in which two captured images of the binary coded light pattern, whose widths are equal to or shorter than the minimum width, and its reversed binary coded light pattern are added.

Figure 4A:
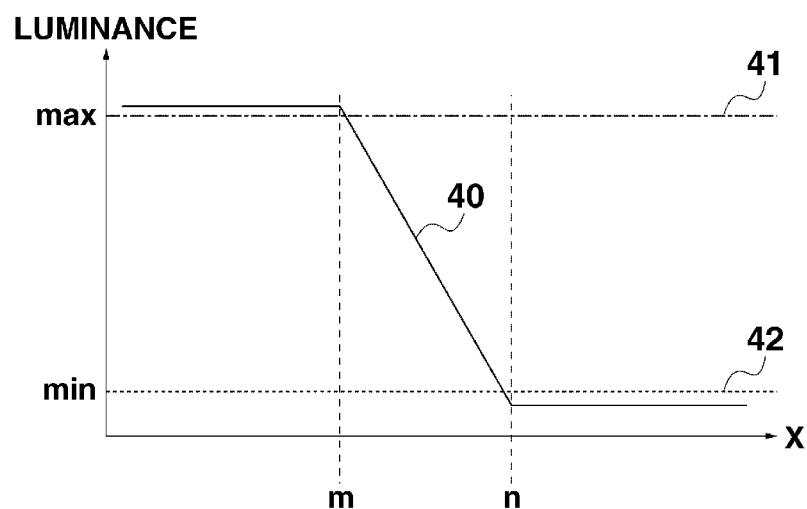
FIG. 4A illustrates a flow of a method for determining a boundary position according to the first exemplary embodiment.
Figure 4B:
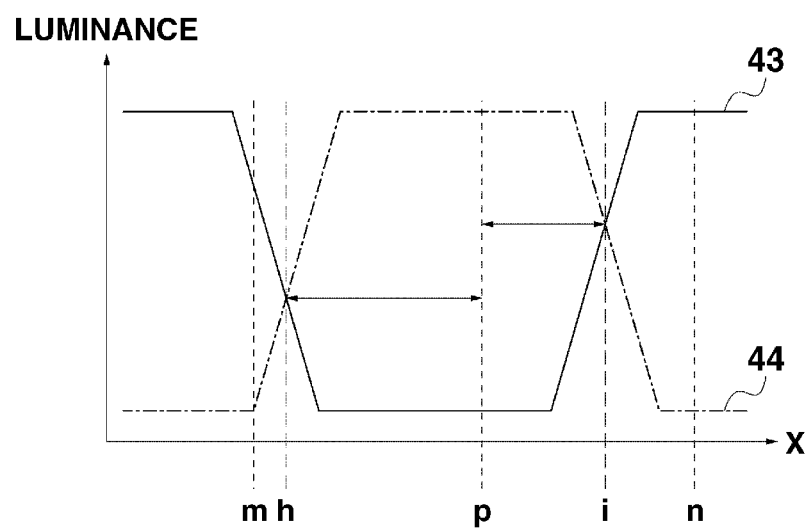
FIG. 4B illustrates a flow of a method for determining a boundary position according to the first exemplary embodiment.

FIGS. 4A and 4B schematically illustrate a flow of a method for determining the boundary position. In FIG. 4A, a range in the vicinity of the boundary position (hereinafter referred to as a boundary range) is set to the image data captured by any of the stripe light patterns 20.

A maximum luminance value 41 and a minimum luminance value 42 are previously set to set the boundary range. The maximum luminance value 41 and the minimum luminance value 42 are an upper limit of luminance and a lower limit of luminance, respectively. Positions of intersections of the maximum and the minimum luminance value 41 and 42 and the luminance line 40 of the image data captured using the stripe light pattern 20 are determined In FIG. 4A, the intersection of the straight lines of the maximum luminance value 41 and the luminance line 40 is determined as a position m. The intersection of the straight lines of the minimum luminance value 42 and the luminance line 40 is determined as a position n. The distance between m and n determined by the above processing is set as the boundary range. The boundary range m-n is the one in which the captured image varies from a high to a low luminance. The boundary position exists in the boundary range m-n.

A method for determining the boundary position in the boundary range m-n from the image data captured using the binary coded light pattern 21 and the reversed binary coded light pattern 22 will be described.

When two images captured using the binary coded light pattern 21 and the reversed binary coded light pattern 22 are used, two boundary positions (intersection positions) may be determined. For this reason, it is necessary to determine which boundary position among the two intersection positions is taken as the boundary position.

In FIG. 4B, for the sake of easy understanding and simplicity, the boundary range m-n of the horizontal coordinate is expanded. Positions at which a luminance line 43 of the image data captured using the binary coded light pattern 21 and a luminance line 44 of the image data captured using the reversed binary coded light pattern 22 intersect with each other are determined in the boundary range m-n. If one intersection exists, the intersection may be determined as the boundary position.

If two or more intersections exist, FIG. 4B illustrates which of them is to be taken as the boundary position. In FIG. 4B, intersection positions that are the candidates for the boundary position are positions h and i. The intermediate position p of the boundary range m-n is used to determine the boundary position. A distance from the intermediate position p to the position h and a distance from the intermediate position p to the position i are obtained to determine which position is close to the intermediate position p.

In FIG. 4B, since the position i is closer to the intermediate position p than the position h, the position i is determined as the boundary position. The abovementioned flow is described in detail with reference to a flow chart illustrated in FIG. 5. The flow chart described below is executed by the calculation processing unit 1, the projector 12, and the camera 13.

In step S500, the N-bit spatially coded stripe light pattern 20, the binary coded light pattern 21 and the reversed binary coded light pattern 22, which are equal to or smaller than the minimum width of the LSB light pattern, are projected from the projector 12 onto the object 17. The object 17 onto which the reversed binary coded light pattern 22 is projected is captured by the camera 13.

If the distance between the dark and the light portion in the binary coded light pattern 21 and the reversed binary coded light pattern 22 is smaller than that of the stripe light pattern 20, the distance does not always need to be the minimum width.

In step S501, luminance values are calculated from each of the captured image data of the stripe light pattern 20. The maximum luminance value 41 and the minimum luminance value 42 previously set to the luminance values are used as threshold values. The intersections of the luminance line 40 of the image data captured using the stripe light pattern 20 and the maximum, and the minimum luminance value 41 and 42 are calculated.

In step S502, it is determined whether the distance between the calculated intersections in the maximum and the minimum luminance value 41 and 42 is shorter than a predetermined pixel. In general, even if the boundary between the light and dark portions is expanded owing to blur due to a focal length or reflectance of the object 17, the expansion is within several pixels. If the distance between the intersections exceeds several pixels, this seems to be a measurement error.

If the distance between the intersections is shorter than several pixels (YES in step S502), the processing proceeds to step S503. If the distance between the intersections is not shorter than several pixels (NO in step S502), the processing proceeds to error. In step S503, the distance between the intersections in the maximum and the minimum luminance value 41 and 42 is specified as the boundary range of the light and dark portions.

In step S504, the positions at which the luminance line 43 of the image data captured using the binary coded light pattern 21 and the luminance line 44 of the image data captured using the reversed binary coded light pattern 22 intersect with each other are calculated in the boundary range.

In step S505, if there is one intersection (NO in step S505), the processing proceeds to step S508. The only one intersection position is determined as the boundary position of the light and dark portions.

If there are two or more intersections (YES in step S505), the processing proceeds to step S506. In step S506, the intermediate position of the boundary range is calculated. In step S507, each of the distances from the intermediate position to a plurality of intersection positions is calculated, and the intersection position that is the closest to the intermediate position among all the intersection positions is acquired. In step S508, the intersection position that is the closest to the intermediate position is determined as the boundary position of the light and dark portions.

Thus, the boundary position of the light and dark portions of the N-bit spatially coded stripe light pattern 20 can be determined. Similar to the complementary pattern projection method, the first exemplary embodiment determines the boundary position using two images whose the light and dark portions of the stripe are reverse to each other to allow determining the boundary position as accurately as the complementary pattern projection method. The number of the patterns to be captured in N bits becomes N+2, which is as small as that of the average image comparison method.

According to the present exemplary embodiment, the position of an object can be accurately and quickly measured based on the captured image of the object onto which light pattern is projected.

Example 2

Figure 6:
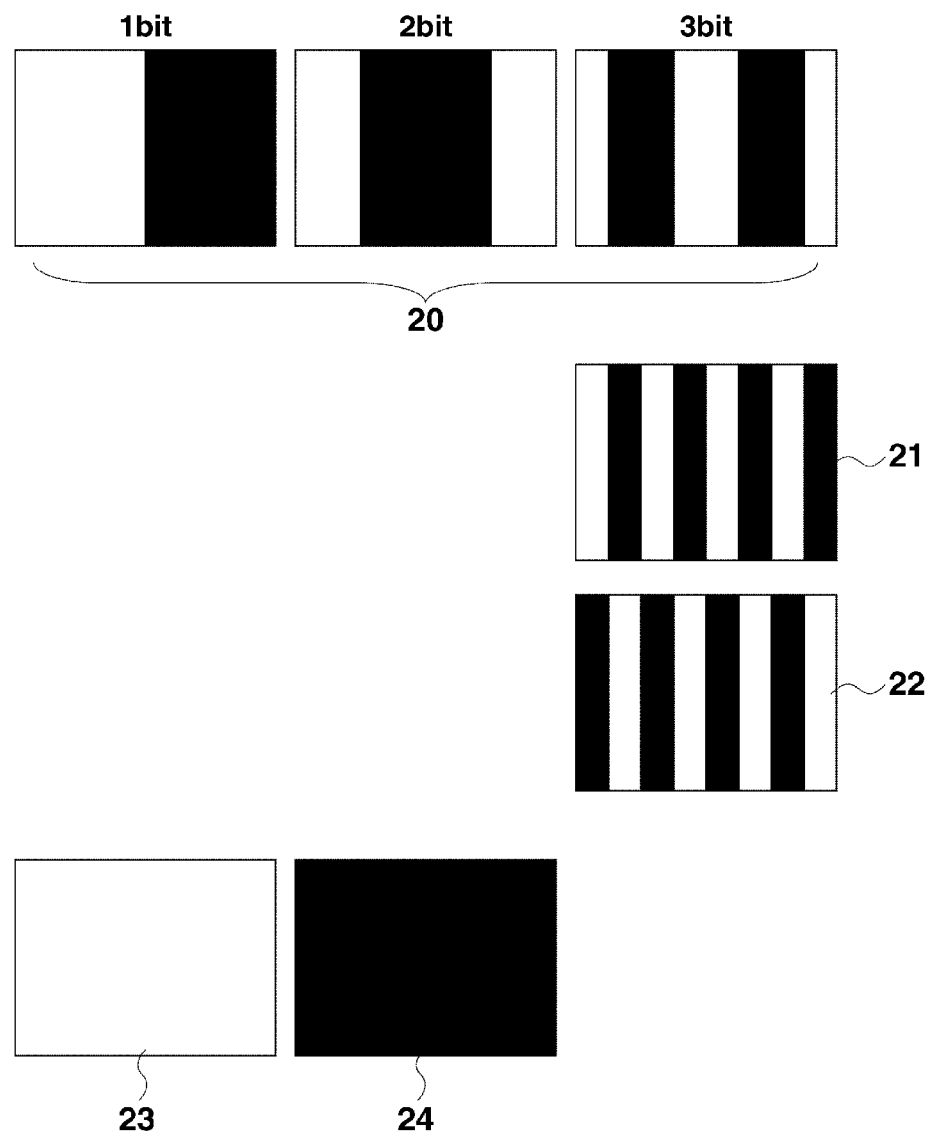
FIG. 6 illustrates a stripe light pattern to be projected according to a second exemplary embodiment.

A second exemplary embodiment is different from the first exemplary embodiment in the stripe light patterns to be projected and a flow for determining the boundary position. FIG. 6 illustrates the stripe light patterns to be projected.

The stripe light pattern 20, the binary coded light pattern 21, and the reversed binary coded light pattern 22, which are spatially coded by a 3-bit gray code, are equivalent to those in FIG. 2. The whole illumination pattern 23 only with a light portion and the whole blackout pattern 24 only with a dark portion are added.

Figure 7A:
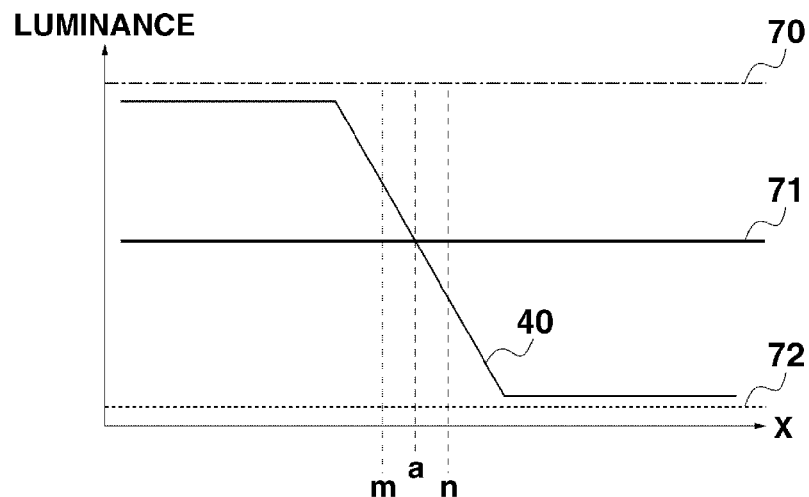
FIG. 7A illustrates a flow of a method for determining a boundary position according to the second exemplary embodiment.
Figure 7B:
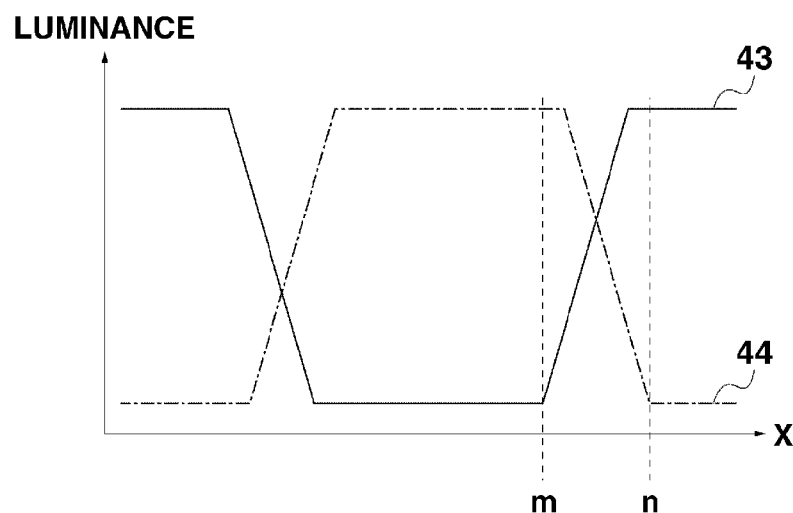
FIG. 7B illustrates a flow of a method for determining a boundary position according to the second exemplary embodiment.

FIGS. 7A and 7B schematically illustrate a flow of a method for determining the boundary position. In FIG. 7A, a boundary range is set in the image data captured using any of the stripe light pattern 20. For that purpose, the average image comparison method is used.

A luminance line 70 is the luminance line of the image data captured by the whole illumination pattern 23. A luminance line 72 is the luminance line of the image data captured using the whole blackout pattern 24. The average of the luminance line 70 and the luminance line 72 is calculated, and set as a luminance line 71. The position of intersection of the luminance line 40 of the stripe light pattern 20 and the luminance line 71 of the average is determined In FIG. 7A, the intersection position is indicated by a position a. A predetermined spread from the position a is taken as the boundary range. In FIG. 7A, the distance between m and n is taken as the boundary range. Since the boundary position is determined by the average image comparison method, the predetermined spread may be as small as one or two pixels.

In FIG. 7B, positions at which the luminance line 43 of the image data captured using the binary coded light pattern 21 and the luminance line 44 of the image data captured using the reversed binary coded light pattern 22 intersect with each other are determined in the distance m-n. The boundary range m-n is so small that only one intersection basically exists. The above intersection is determined as the boundary position.

The above flow is described in detail with reference to a flow chart illustrated in FIG. 8. Similar to the first exemplary embodiment, the processing of the flow chart described below is processed by the calculation processing unit 1, the projector 12, and the camera 13.

In step S800, the N-bit spatially coded stripe light pattern 20, the binary coded light pattern 21 and the reversed binary coded light pattern 22, which are equal to or smaller than the minimum width of the LSB light pattern, are projected from the projector 12 onto the object 17. In the present exemplary embodiment, the whole illumination pattern 23 and the whole blackout pattern 24 are also projected. The object 17 onto which the reversed binary coded light pattern 22 is projected is captured by the camera 13.

In step S801, the boundary position is determined by the average image comparison method from the image data captured using the whole illumination pattern 23 and the whole blackout pattern 24. In step S802, the predetermined spread is provided for the calculated boundary position. In step S803, the boundary range is specified. The subsequent steps are similar to those in FIG. 5, so that the description thereof is omitted.

Although the number of the captured images in the second exemplary embodiment is larger by two than that in the first exemplary embodiment, the boundary range can be more accurately specified than the second exemplary embodiment. For that reason, only one intersection of the two image data captured by the binary coded light pattern 21 and the reversed binary coded light pattern 22 is determined in the boundary range to simplify the flow for determining the boundary position, improving a calculation time period for the determination. This also eliminates an erroneous determination of the intersection position to improve accuracy.

Example 3

Figure 9:
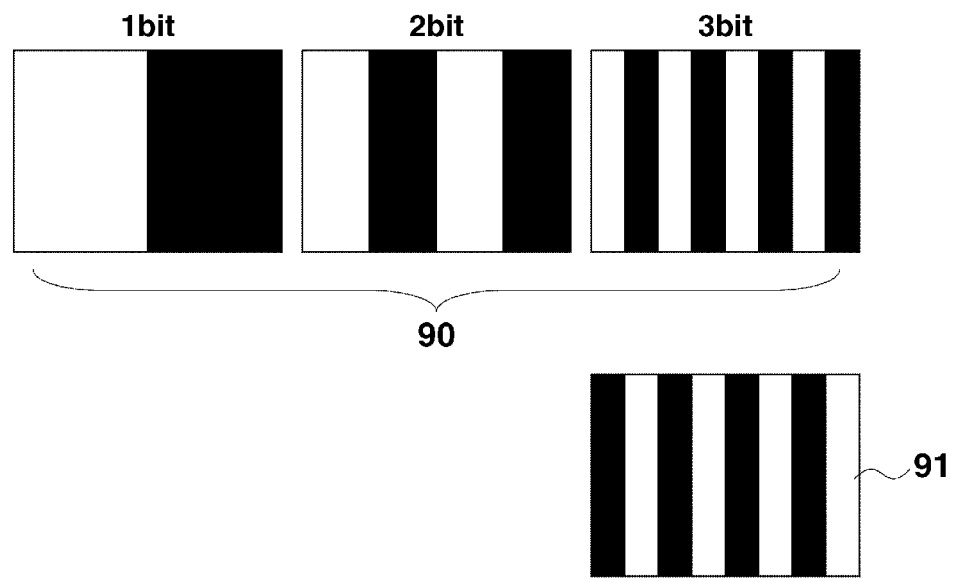
FIG. 9 illustrates a stripe light pattern to be projected according to a third exemplary embodiment.

In a third exemplary embodiment, the stripe light pattern to be projected is a simple binary coded pattern. FIG. 9 illustrates the stripe light patterns to be projected. A stripe light pattern 90 is the stripe light pattern spatially coded by 3 bits. A reversed binary-coded light pattern 91 is the stripe light pattern in which the LSB pattern of the stripe light pattern 90 is reversed.

Figure 10A:
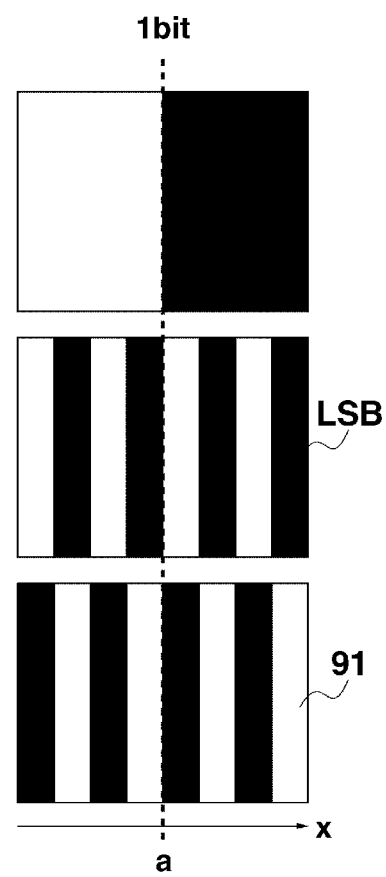
FIG. 10A illustrates the principle for determining a boundary position according to the third exemplary embodiment.
Figure 10B:
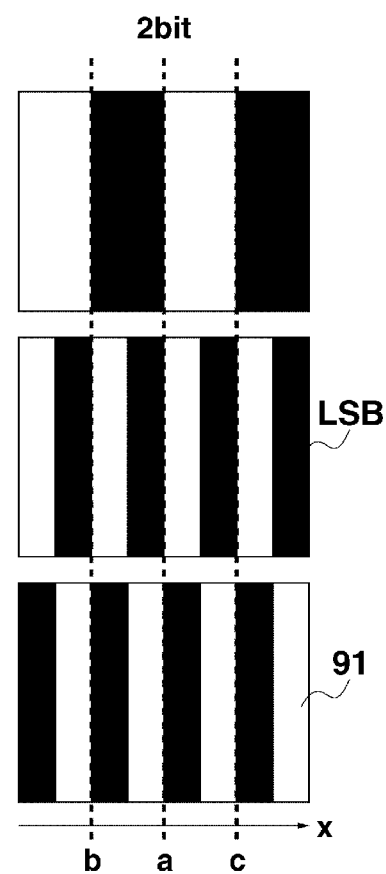
FIG. 10B illustrates the principle for determining a boundary position according to the third exemplary embodiment.
Figure 10C:
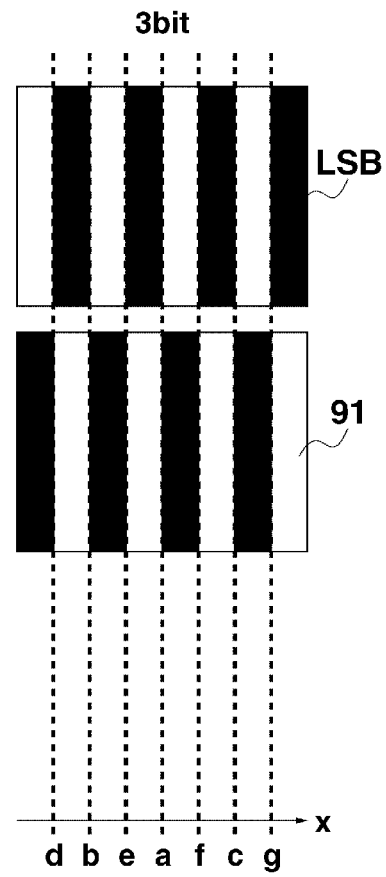
FIG. 10C illustrates the principle for determining a boundary position according to the third exemplary embodiment.

FIGS. 10A, 10B, and 10C schematically illustrate the principle for determining a boundary position in the third exemplary embodiment. FIG. 10A illustrates the 1st bit stripe light pattern 90, the LSB pattern of the stripe light pattern 90, and the reversed binary-coded light pattern 91.

Referring to FIG. 10A, it can be seen that the boundary position between the light and dark portions in a position "a" of the horizontal coordinate of the LSB pattern of the stripe light pattern 90 and the reversed binary-coded light pattern 91 corresponds to the boundary position between the light and dark portions in the 1st bit stripe light pattern 90. This is clear from the boundary position to be determined between the light and dark portions in the 1st bit stripe light pattern 90 and the correspondence of the LSB pattern of the stripe light pattern 90 to the reversed binary-coded light pattern 91.

FIG. 10B illustrates the 2nd bit stripe light pattern 90, the LSB pattern of the stripe light pattern 90, and the reversed binary-coded light pattern 91. Paying attention to the correspondence to the boundary position similarly to the above, the boundary position between the light and dark portions in positions "a," "b," and "c" of the horizontal coordinate of the LSB pattern of the stripe light pattern 90 and the reversed binary-coded light pattern 91 corresponds to the boundary position between the light and dark portions in the 2nd bit stripe light pattern 90.

FIG. 10C illustrates the 3rd bit stripe light pattern 90, the LSB pattern of the stripe light pattern 90, and the reversed binary-coded light pattern 91. Similarly, the boundary position between the light and dark portions in positions "a," "b," "c," "d," "e," "f," and "g" of the horizontal coordinate of the LSB pattern of the stripe light pattern 90 and the reversed binary-coded light pattern 91 corresponds to the boundary position between the light and dark portions in the 3rd bit stripe light pattern 90.

Thus, in the spatial coding of the binary coded pattern, the boundary position can be determined using the LSB pattern and its reversed light pattern.

Figure 5:
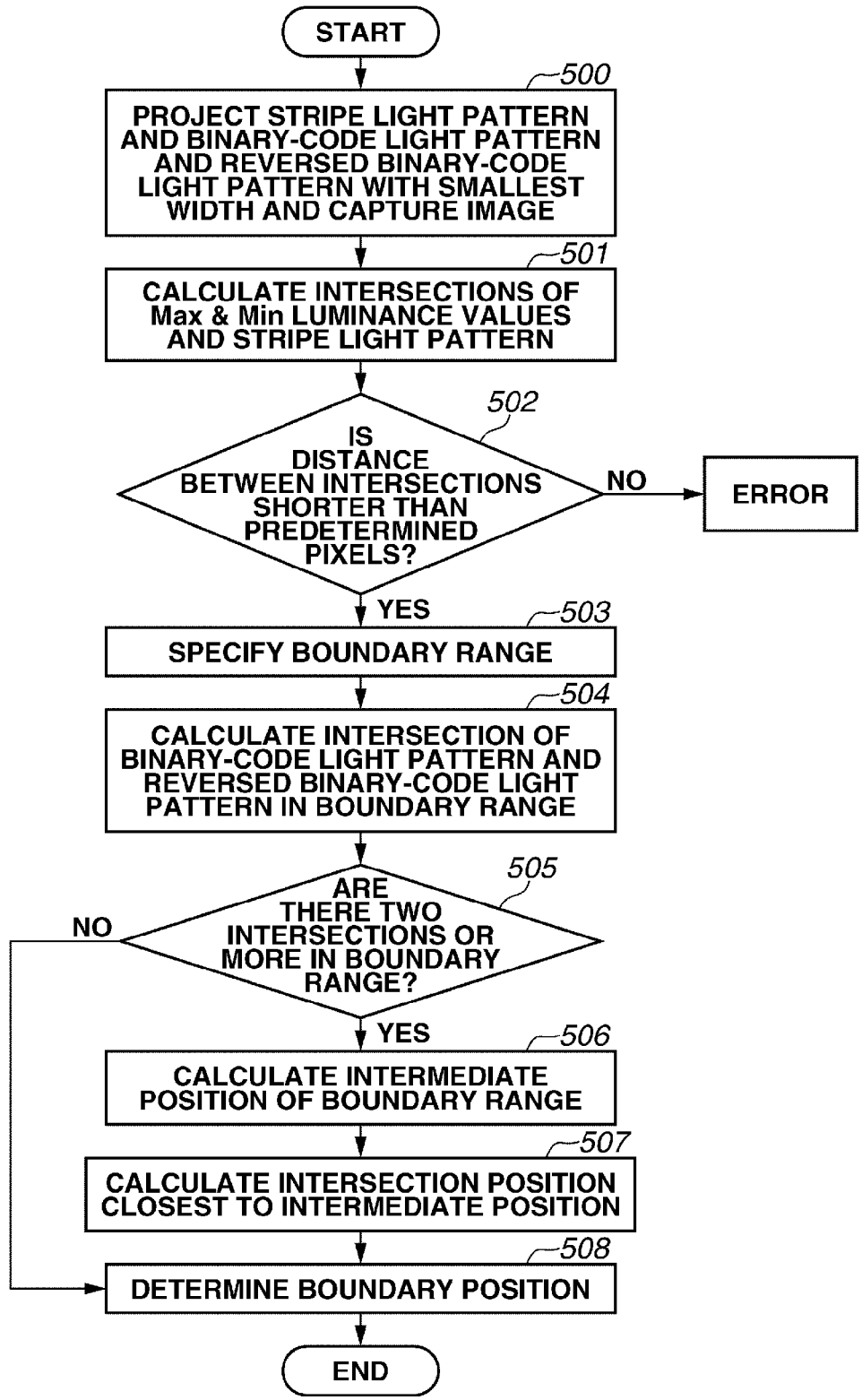
FIG. 5 is a flow chart illustrating a method for determining a boundary position according to the first exemplary embodiment.
Figure 8:
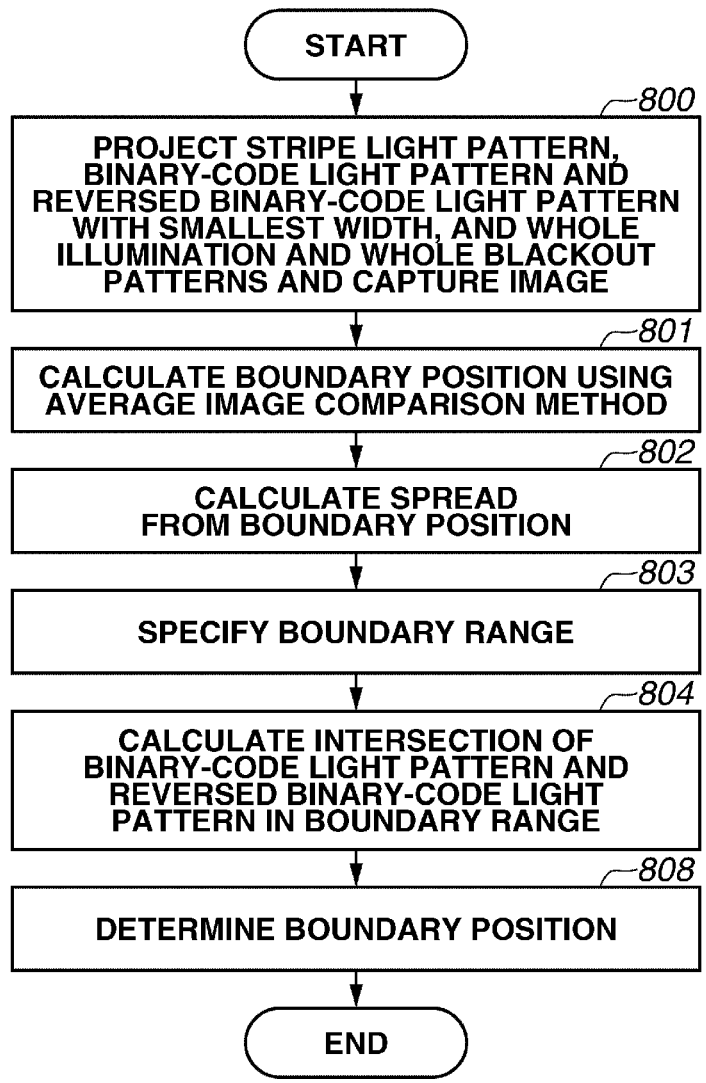
FIG. 8 is a flow chart illustrating a method for determining a boundary position according to the second exemplary embodiment.

The boundary position can be determined using the processing in the flow charts illustrated in FIG. 5 for the first exemplary embodiment and in FIG. 8 for the second exemplary embodiment. The boundary position can be determined, in the third exemplary embodiment, by using the number of the patterns smaller by one than that in the first exemplary embodiment to reduce an image capturing time period.

Example 4

Figure 11A:
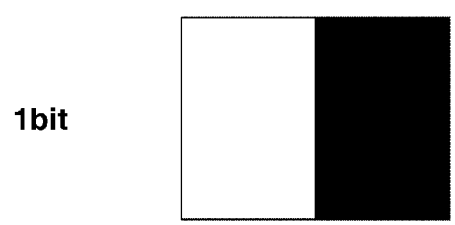
FIG. 11A illustrates a method for producing a stripe light pattern to be projected according to a fourth exemplary embodiment.
Figure 11B:
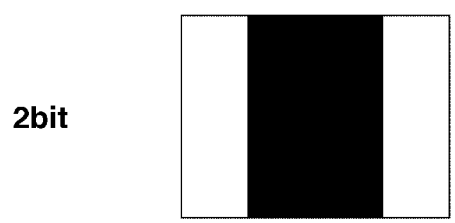
FIG. 11B illustrates a method for producing a stripe light pattern to be projected according to a fourth exemplary embodiment.
Figure 11C:
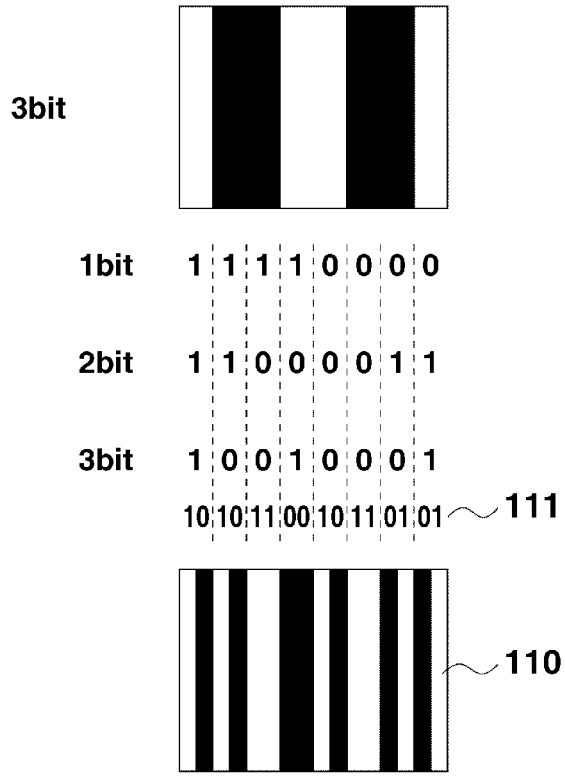
FIG. 11C illustrates a method for producing a stripe light pattern to be projected according to a fourth exemplary embodiment.

In a fourth exemplary embodiment, the pattern to be projected is a gray code. FIGS. 11A, 11B, and 11C illustrate a method for producing patterns for determining a boundary position. The present exemplary embodiment is described below using the 3-bit spatial coding as an example.

FIGS. 11A, 11B, and 11C illustrate 1st-, 2nd- and 3rd-bit stripe light pattern, respectively. At the lower part of the figure, the light and dark portions are coded as 1 and 0 respectively. Places of 10 or 01 are reversed to produce coded patterns of 1 and 0. A coding 111 is a reversed pattern. The width of the light and dark portions is equal to ½ width of the minimum width of the LSB pattern. The coding 111 is converted into an image to produce a coded light pattern 110.

Theoretically, all of the boundary positions in the 1st, the 2nd and the 3rd bit are different in the gray code, so that the boundary position can be determined by the coded light pattern 110 with ½ width of the minimum width.

Figure 12A:
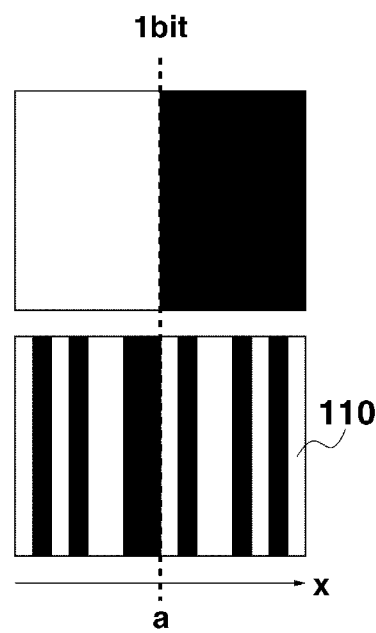
FIG. 12A illustrates the principle for determining a boundary position according to a fourth exemplary embodiment.
Figure 12B:
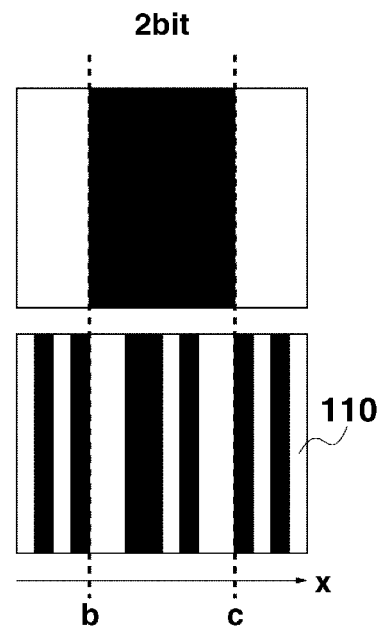
FIG. 12B illustrates the principle for determining a boundary position according to a fourth exemplary embodiment.

FIGS. 12A, 12B, and 12B schematically illustrate the principle for determining a boundary position in the fourth exemplary embodiment. FIG. 12A illustrates the 1st bit stripe light pattern and the coded light pattern 110. Paying attention to the correspondence of the boundary position to be determined between the light and dark portions of the 1st bit stripe light pattern to the coded light pattern 110, it can be seen that the boundary position between the light and dark portions in a position "a" of the horizontal coordinate of the coded light pattern 110 corresponds to the boundary position between the light and dark portions of the 1st bit stripe light pattern.

FIG. 12B illustrates the 2nd bit stripe light pattern and the coded light pattern 110. Paying attention to the correspondence similarly, the boundary position between the light and dark portions in positions "b," and "c" of the horizontal coordinate of the coded light pattern 110 corresponds to the boundary position between the light and dark portions of the 2nd bit stripe light pattern.

Figure 12C:
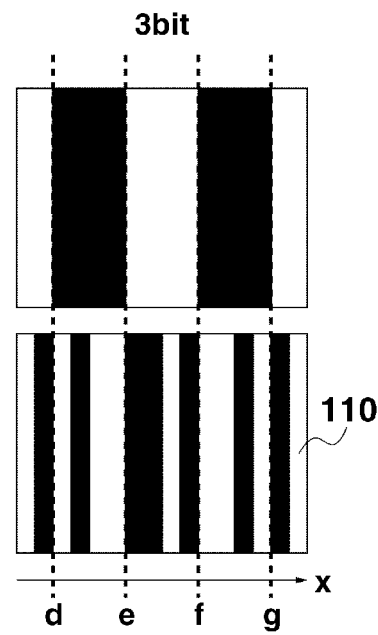
FIG. 12C illustrates the principle for determining a boundary position according to a fourth exemplary embodiment.
Figure 13:
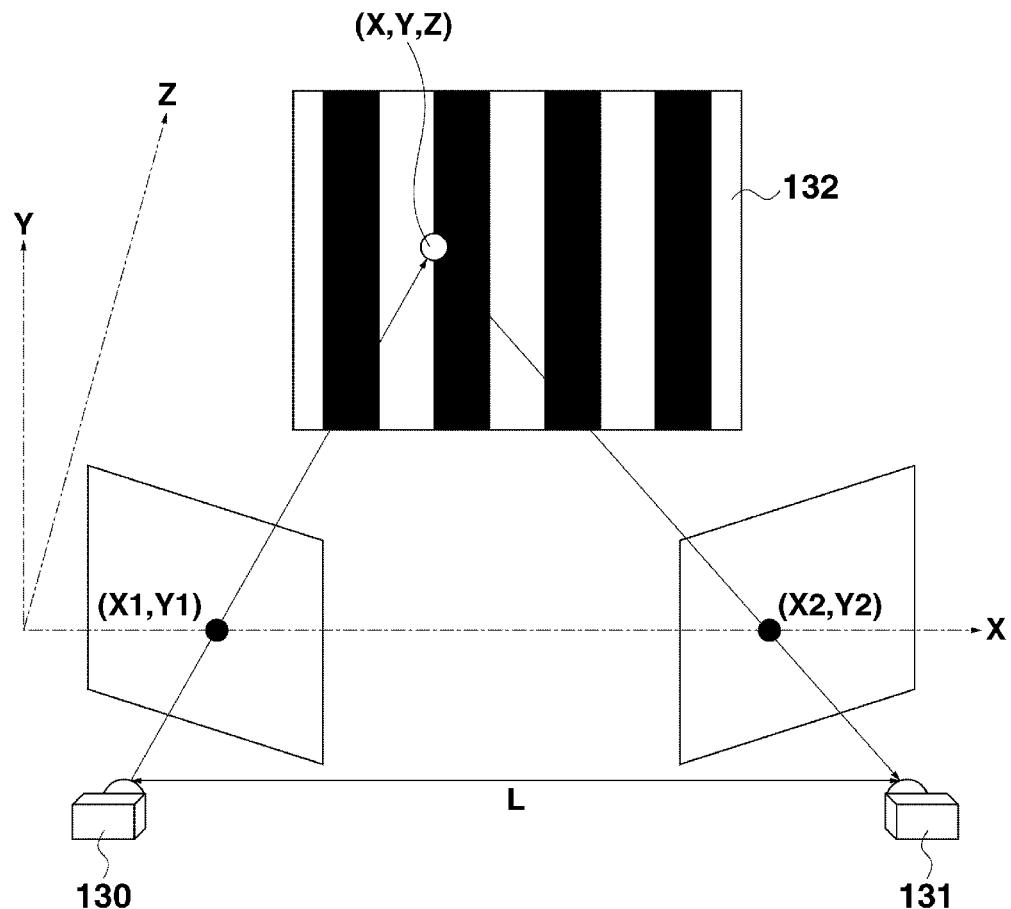
FIG. 13 illustrates a configuration of an object shape measuring apparatus and a concept of a measuring method.
Figure 14A:
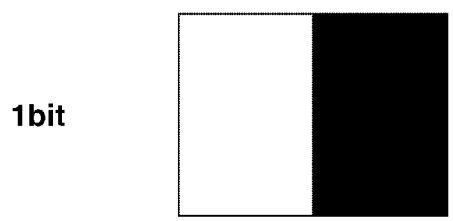
FIG. 14A illustrates a stripe light pattern to be projected by a spatial coding method using a binary code.
Figure 14B:
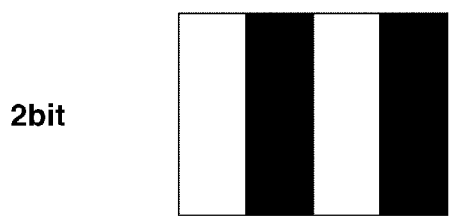
FIG. 14B illustrates a stripe light pattern to be projected by a spatial coding method using a binary code.
Figure 14C:
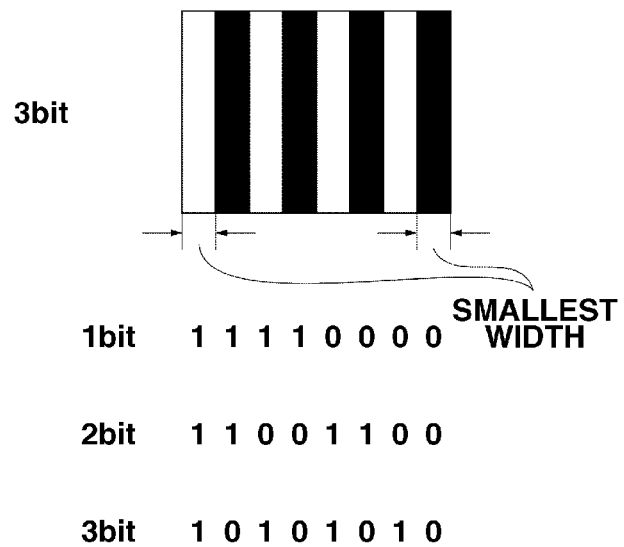
FIG. 14C illustrates a stripe light pattern to be projected by a spatial coding method using a binary code.
Figure 15A:
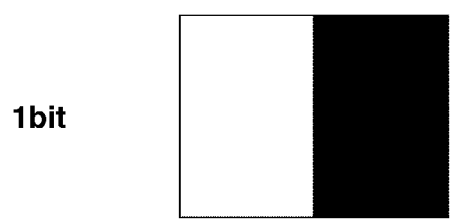
FIG. 15A illustrates a stripe light pattern to be projected by the spatial coding method using a gray code.
Figure 15B:
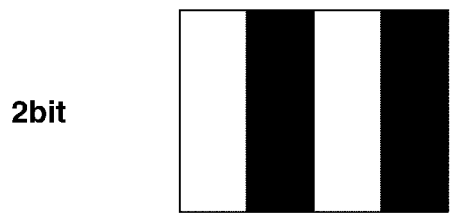
FIG. 15B illustrates a stripe light pattern to be projected by the spatial coding method using a gray code.
Figure 15C:
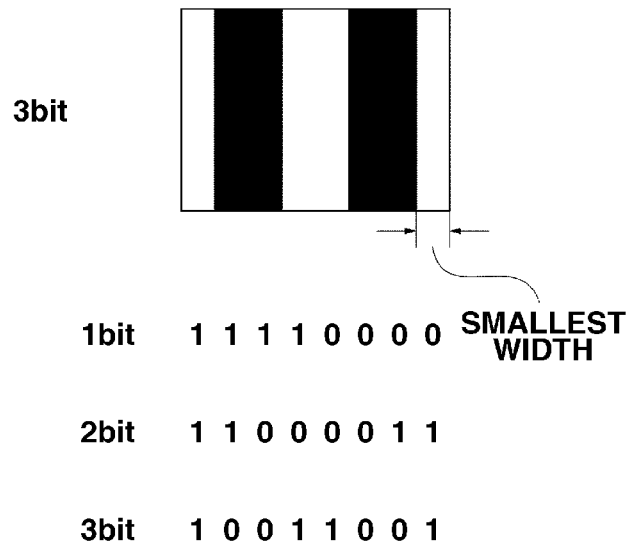
FIG. 15C illustrate a stripe light pattern to be projected by the spatial coding method using a gray code.
Figure 16A:
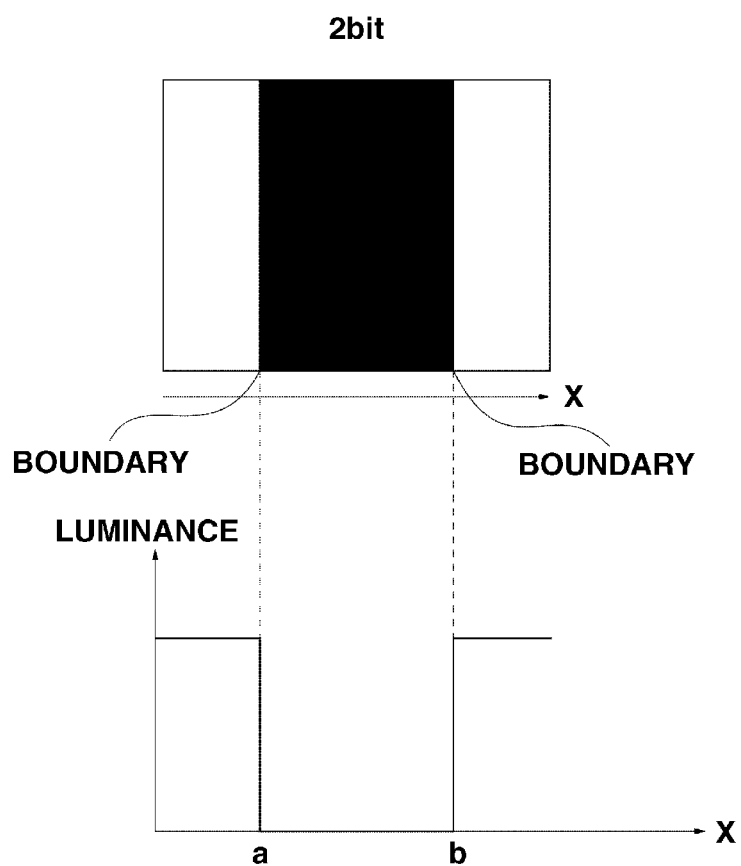
FIG. 16A illustrates a boundary position between a light and a dark portion.
Figure 16B:
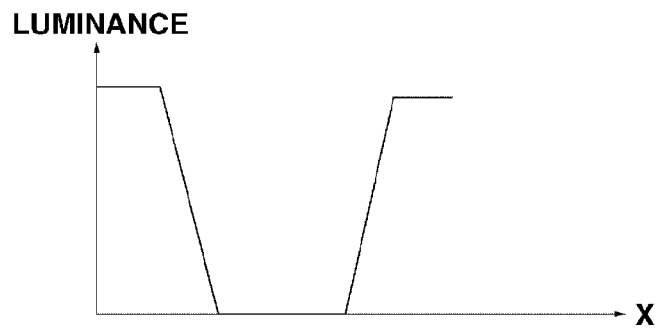
FIG. 16B illustrate a boundary position between a light and a dark portion.
Figure 17A:
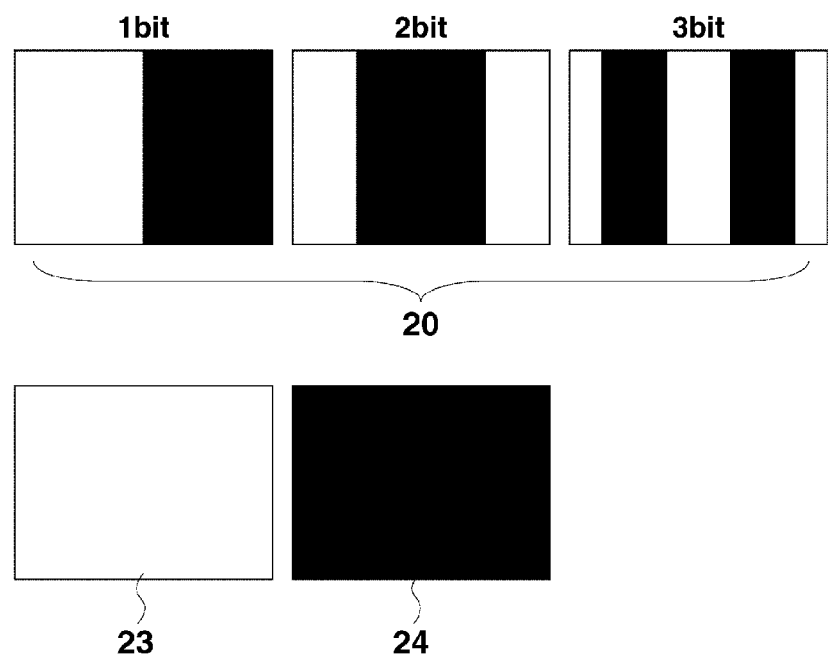
FIG. 17A illustrates an average image comparison method.
Figure 17B:
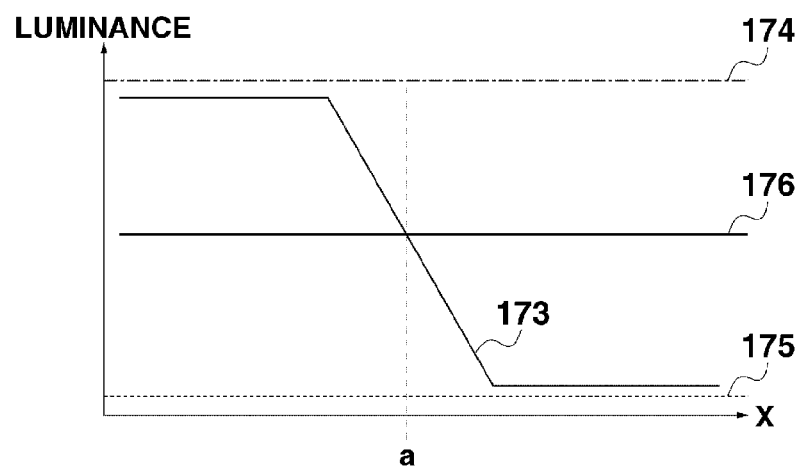
FIG. 17B illustrates an average image comparison method.
Figure 18A:
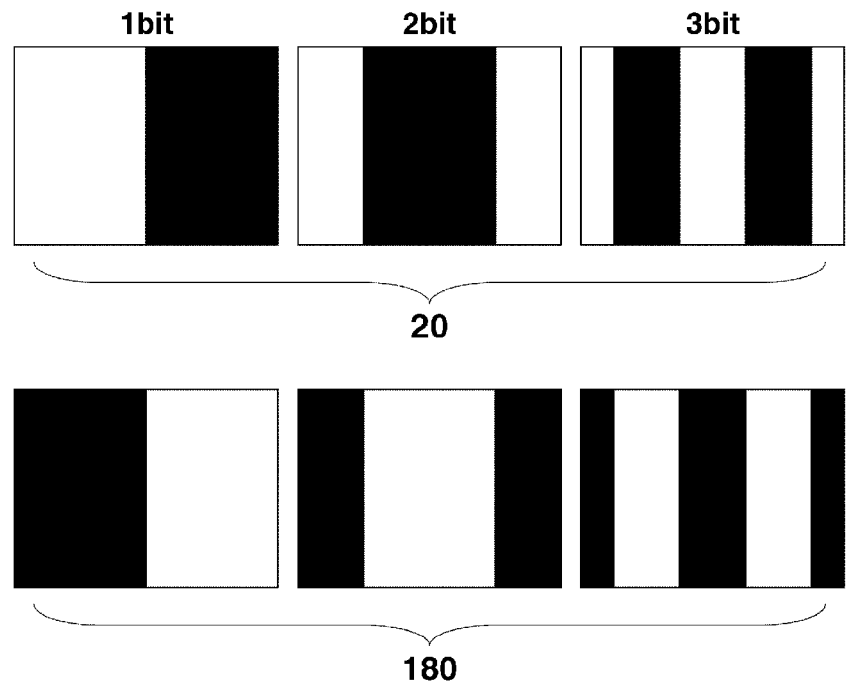
FIG. 18A illustrates a complementary pattern projection method.
Figure 18B:
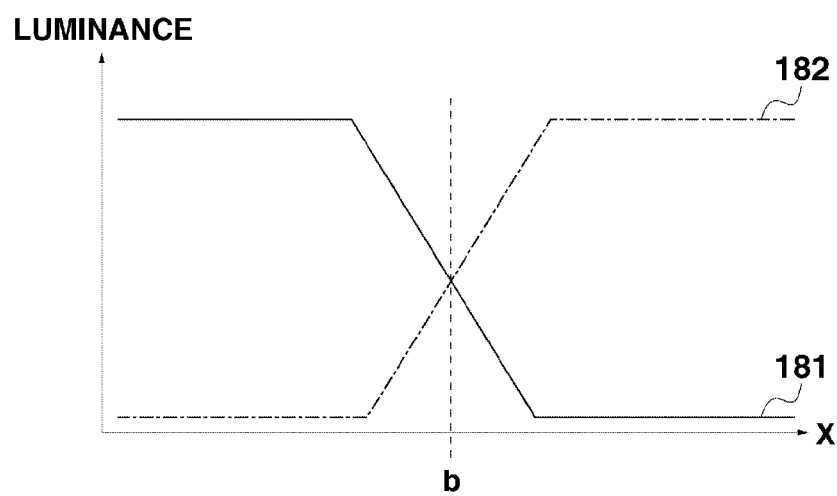
FIG. 18B illustrates a complementary pattern projection method.

FIG. 12C illustrates the 3rd bit stripe light pattern and the coded light pattern 110. Paying attention to the correspondence similarly, the boundary position between the light and dark portions in positions "d," "e," "f," and "g" of the horizontal coordinate of the coded light pattern 110 corresponds to the boundary position between the light and dark portions of the 3rd bit stripe light pattern.

Thus, in the spatial coding of the gray code, the boundary position can be determined using the coded light pattern 110 as the reversed light pattern. The boundary position can be determined using the processing in the flow charts illustrated in FIG. 5 for the first exemplary embodiment and in FIG. 8 for the second exemplary embodiment.

The boundary position can be determined using patterns the number of which in the fourth exemplary embodiment is smaller by one than that in the first exemplary embodiment to reduce an image capturing time period.

When the boundary range is specified, the third and the fourth exemplary embodiment may use the average image comparison method used in the second exemplary embodiment.

Example 5

A fifth exemplary embodiment is different from the first exemplary embodiment in a captured image used in determining the boundary position. A method for determining a boundary position in the present exemplary embodiment is described below.

Figure 19A:
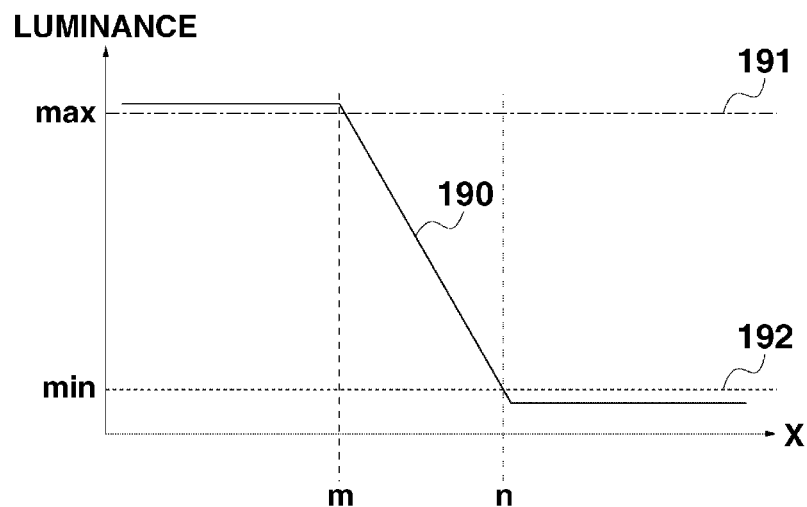
FIG. 19A illustrates the principle for determining a boundary position according to a fifth exemplary embodiment.
Figure 19B:
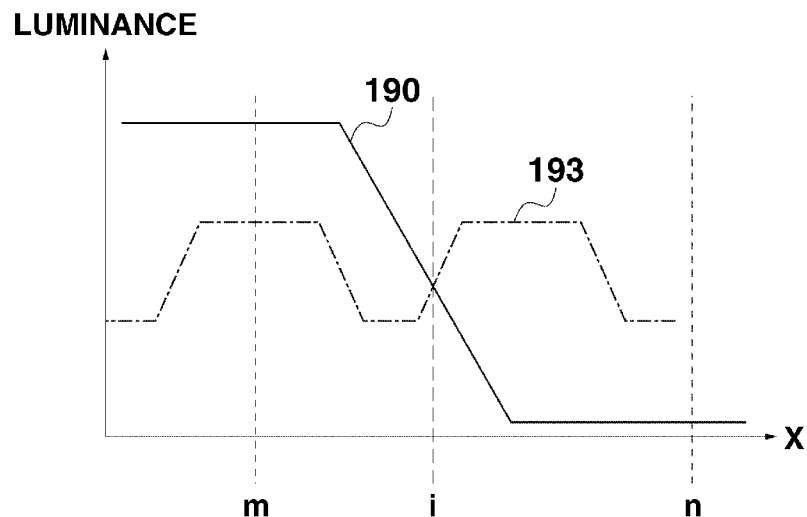
FIG. 19B illustrate the principle for determining a boundary position according to a fifth exemplary embodiment.

FIGS. 19A and 19B schematically illustrate a flow of a method for determining a boundary position. In FIG. 19A, a range in the vicinity of the boundary position (hereinafter referred to as a boundary range) is set to the image data captured by any of the stripe light patterns 20. A maximum luminance value 191 and a minimum luminance value 192 are previously set to set the boundary range.

The maximum luminance value 191 and the minimum luminance value 192 are an upper limit of luminance and a lower limit of luminance respectively. Positions of intersections of the maximum and the minimum luminance values 191 and 192 and the luminance line 190 of the image data captured using the stripe light pattern 20 are determined In FIG. 19A, the intersection of the straight lines of the maximum luminance value 191 and the luminance line 190 is determined as a position m. The intersection of the straight lines of the minimum luminance value 192 and the luminance line 190 is determined as a position n. The distance between m and n determined by the above processing is taken as the boundary range. The boundary range m-n is the one in which the captured image varies from a high to a low luminance. The boundary position exists in the boundary range m-n.

There is described below a method for determining the boundary position in the boundary range m-n from the image data captured using the stripe light pattern 20 and the binary coded light pattern 21.

In FIG. 19B, for the sake of easy understanding and simplicity, the boundary range m-n of the horizontal coordinate is expanded. A Position at which a luminance line 193 of the image data captured using the binary coded light pattern 21 and a luminance line 190 of the image data captured using the stripe light pattern 20 intersect with each other are determined in the boundary range m-n.

In FIG. 19B, the intersection position is a position i. The position i is determined as the boundary position between the light and dark portions of the stripe light pattern 20. The flow for determining the boundary position using the stripe light pattern 20 and the reversed binary coded light pattern 22 is similar to that for the first exemplary embodiment, so that the description thereof is omitted.

Figure 20:
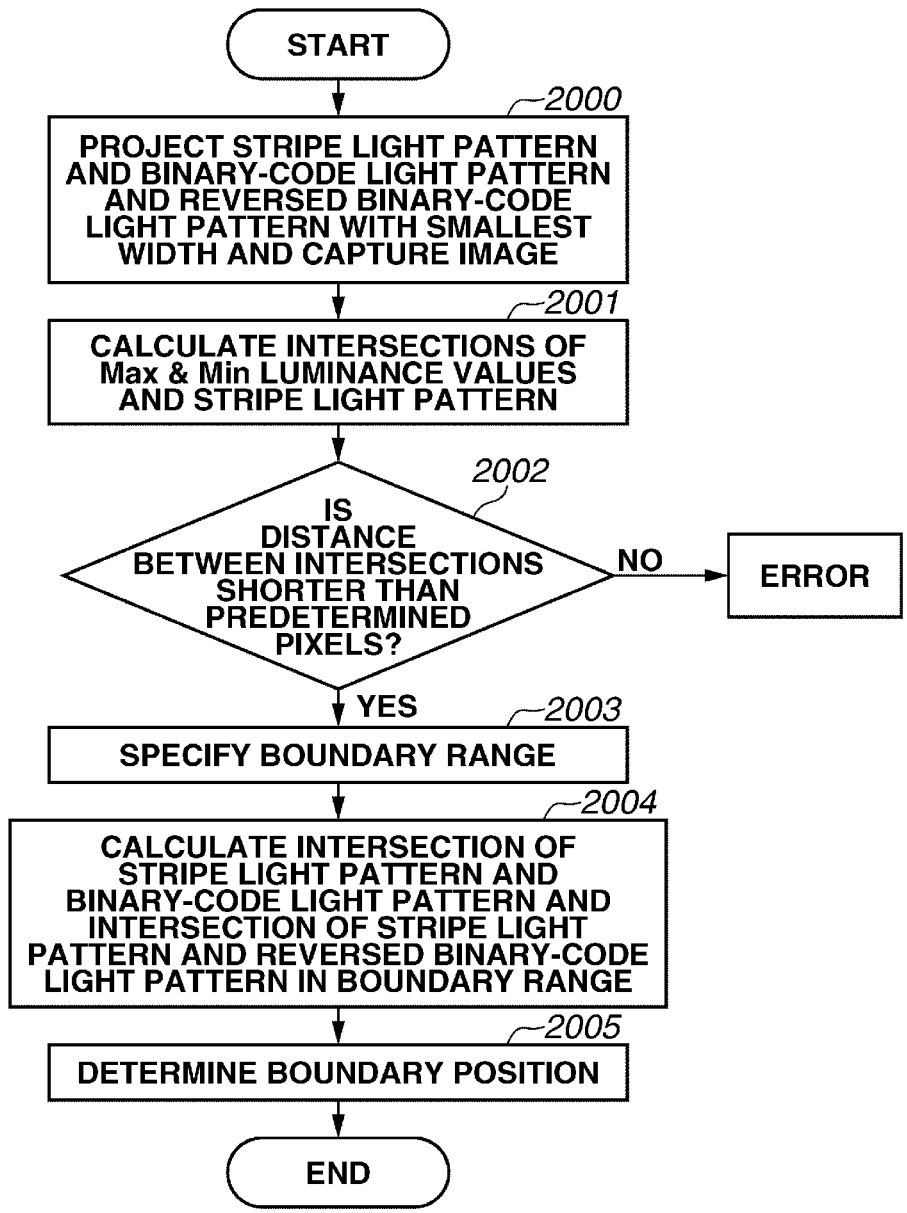
FIG. 20 is a flow chart illustrating a method for determining a boundary position according to the fifth exemplary embodiment.

The abovementioned flow is described in detail with reference to a flow chart illustrated in FIG. 20. The flow chart described below is executed by the calculation processing unit 1, the projector 12, and the camera 13.

In step S2000, the N-bit spatially coded stripe light pattern 20, the binary coded light pattern 21 and the reversed binary coded light pattern 22, which are equal to or smaller than the minimum width of the LSB, are projected from the projector 12 onto the object 17. The object 17 onto which the light patterns are projected is captured by the camera 13.

If the distance between the dark and the light portion in the binary coded light pattern 21 and the reversed binary coded light pattern 22 is smaller than that of the stripe light pattern 20, the distance does not always need to be the minimum width.

In step S2001, luminance values are calculated from each of the captured image data of the stripe light pattern 20. The maximum luminance value 191 and the minimum luminance value 192 previously set to the luminance values are used as threshold values. The intersections of the luminance line 190 of the image data captured using the stripe light pattern 20 and the maximum and the minimum luminance value 191 and 192 are calculated.

In step S2002, it is determined whether the distance between the calculated intersections in the maximum and the minimum luminance value 191 and 192 is shorter than a predetermined pixel. In general, even if the boundary between the light and dark portions is expanded owing to blur due to a focal length or reflectance of the object 17, the expansion is within several pixels. If the distance between the intersections exceeds several pixels, this seems to be a measurement error.

If the distance between the intersections is shorter than several pixels (YES in step S2002), the processing proceeds to step S2003. If the distance between the intersections is not shorter than several pixels (NO in step S2002), the processing proceeds to "error". In step S2003, the distance between the intersections in the maximum and the minimum luminance value 191 and 192 is specified as the boundary range of the light and dark portions.

In step S2004, the position at which the luminance line 193 of the image data captured using the binary coded light pattern 21 and the luminance line 190 of the image data captured using the stripe light pattern intersect with each other is calculated in the boundary range. Similarly, the intersection is calculated for image data captured using the reversed binary coded light pattern 22 and the stripe light pattern 20.

In step S2005, the calculated intersection positions are determined as the boundary position of the light and dark portions. The above-described flow chart is executed for all pixels to allow determining the boundary position of the light and dark portions of the N-bit spatially coded stripe light pattern 20.

The first exemplary embodiment is capable of determining the boundary position of the stripe light pattern 20 using the stripe light pattern, which is different in period from the stripe light pattern 20. The stripe light pattern different in period uses two images in which the light and dark portions of the stripe are reversed to each other to enable the boundary position to be determined as accurately as the complementary pattern projection method.

The number of the patterns to captured in N bits becomes N+2, which is as small as that of the average image comparison method. According to the present exemplary embodiment, the position of an object can be accurately and quickly measured based on the captured image of the object onto which light pattern is projected.

Example 6

In a fifth exemplary embodiment, the pattern to be projected is a gray code. There is described below a method for determining the boundary position using a shift stripe pattern newly generated in such a manner that a predetermined pattern among a plurality of gray codes is shifted sideways by a predetermined period.

Figure 21:
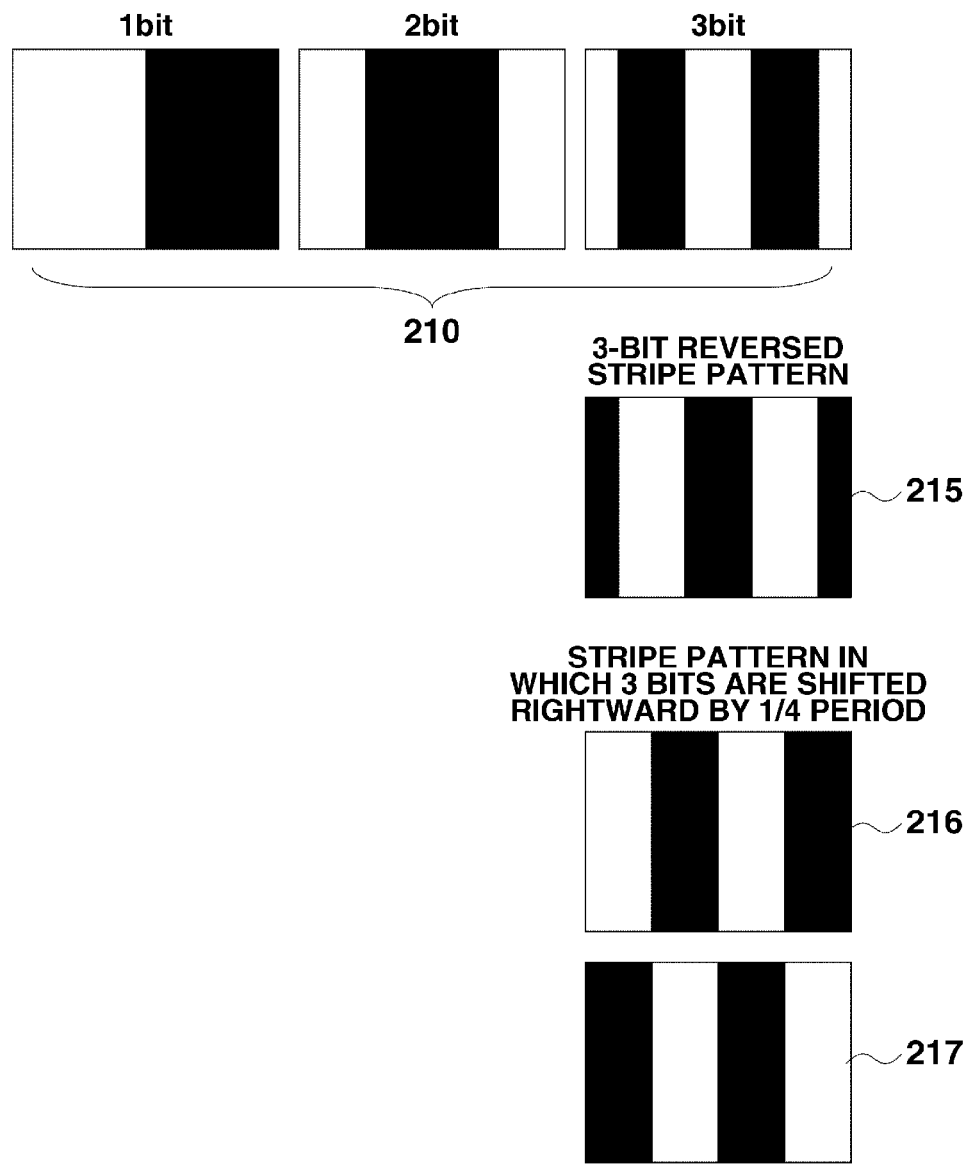
FIG. 21 illustrates the principle for determining a boundary position according to a sixth exemplary embodiment.

FIG. 21 illustrates the stripe light pattern to be projected. There is prepared a stripe light pattern 210 spatially coded by a 3-bit gray code and a 3-bit reversed light pattern 215 in which the light and dark portions of the 3-bit gray code pattern are reversed to each other. In addition, a shift stripe-light pattern 216 in which the 3-bit gray code pattern is shifted rightward by ¼ period and a reversed shift stripe-light pattern 217 in which the light and dark portions of the shift stripe-light pattern 216 are reversed to each other.

Figure 22A:
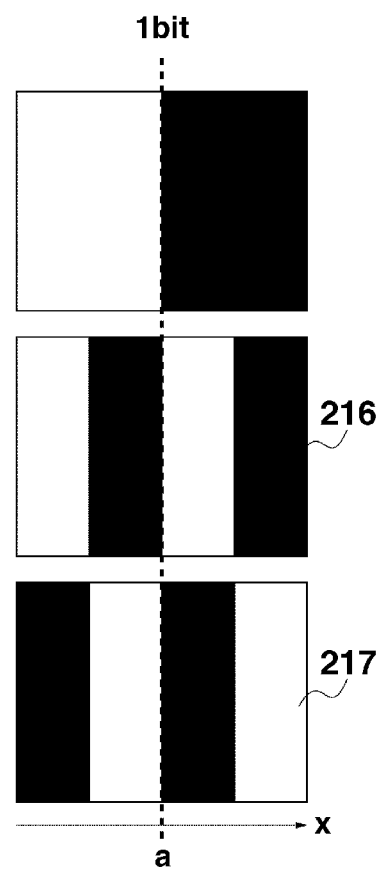
FIG. 22A illustrates the principle for determining a boundary position according to the sixth exemplary embodiment.
Figure 22B:
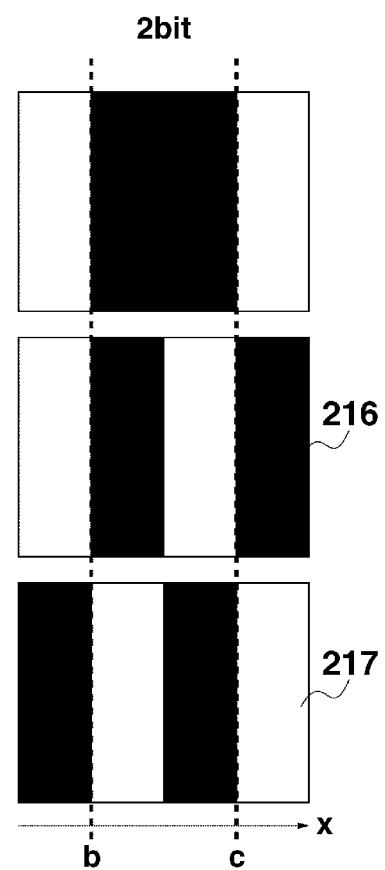
FIG. 22B illustrates the principle for determining a boundary position according to the sixth exemplary embodiment.
Figure 22C:
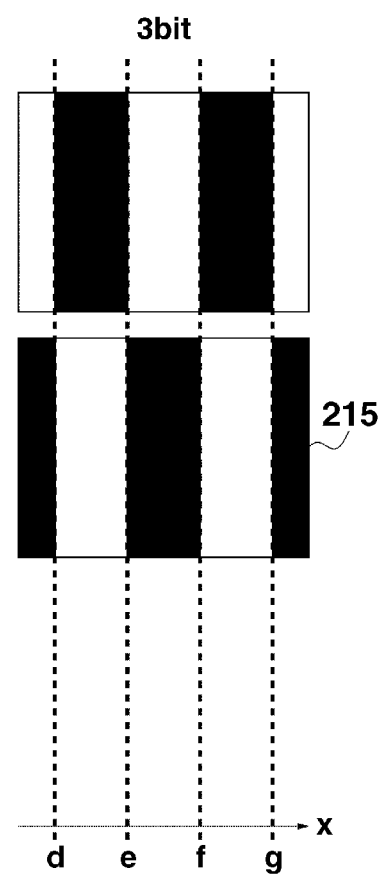
FIG. 22C illustrates the principle for determining a boundary position according to the sixth exemplary embodiment.

FIGS. 22A, 22B, and 22C schematically illustrate the principle for determining a boundary position using the 3-bit reversed light pattern 215, the shift stripe-light pattern 216, and the reversed shift stripe-light pattern 217.

FIG. 22A illustrates a 1st bit stripe light pattern 210, the 3-bit reversed stripe light pattern 215, the shift stripe-light pattern 216, and the reversed shift stripe-light pattern 217. The boundary position between the light and dark portions in the position "a" of the horizontal coordinate of the shift stripe-light pattern 216 and the reversed shift stripe-light pattern 217 corresponds to the boundary position between the light and dark portions in the 1st bit stripe light pattern 210.

Accordingly, the boundary position to be determined between the light and dark portions of the 1st bit stripe light pattern 210 has a relationship in which the light and dark portions of the shift stripe-light pattern 216 and the reversed shift stripe-light pattern 217 are reversed to each other, which enables the boundary position to be determined from the complementary pattern projection method.

FIG. 22B illustrates a 2nd bit stripe light pattern 210, the shift stripe-light pattern 216, and the reversed shift stripe-light pattern 217. Paying attention to the correspondence to the boundary position, the boundary positions between the light and dark portions in the positions "b" and "c" of the shift stripe-light pattern 216 and the reversed shift stripe-light pattern 217 correspond to the boundary positions between the light and dark portions in the 2nd bit stripe light pattern 210.

FIG. 22C illustrates a 3rd bit stripe light pattern 210 and the 3-bit reversed stripe light pattern 215. In the present example, similar to a typical complementary pattern projection method, the boundary positions between the light and dark portions in the positions "d," "e," "f," and "g" correspond to the boundary positions between the light and dark portions in the 3rd bit stripe light pattern 210.

More specifically, the boundary position of a first captured image of a first light pattern (the light pattern 210) can be determined by the complementary pattern projection method with respect to a sixth captured image of a sixth light pattern (the shift stripe-light pattern 216) and a seventh captured image of a seventh light pattern (the reversed shift stripe-light pattern 217).

Similar to the third exemplary embodiment, the fifth exemplary embodiment sets in further detail the range of the boundary position range by the average image comparison method. In the third exemplary embodiment, the average image comparison method uses a captured image in which the whole illumination pattern 213 only with a light portion and the whole blackout pattern 214 only with a dark portion are projected. In the present exemplary embodiment, the average image comparison method uses a captured image in which the shift stripe-light pattern 216 and the reversed shift stripe-light pattern 217 are projected.

Figure 23:
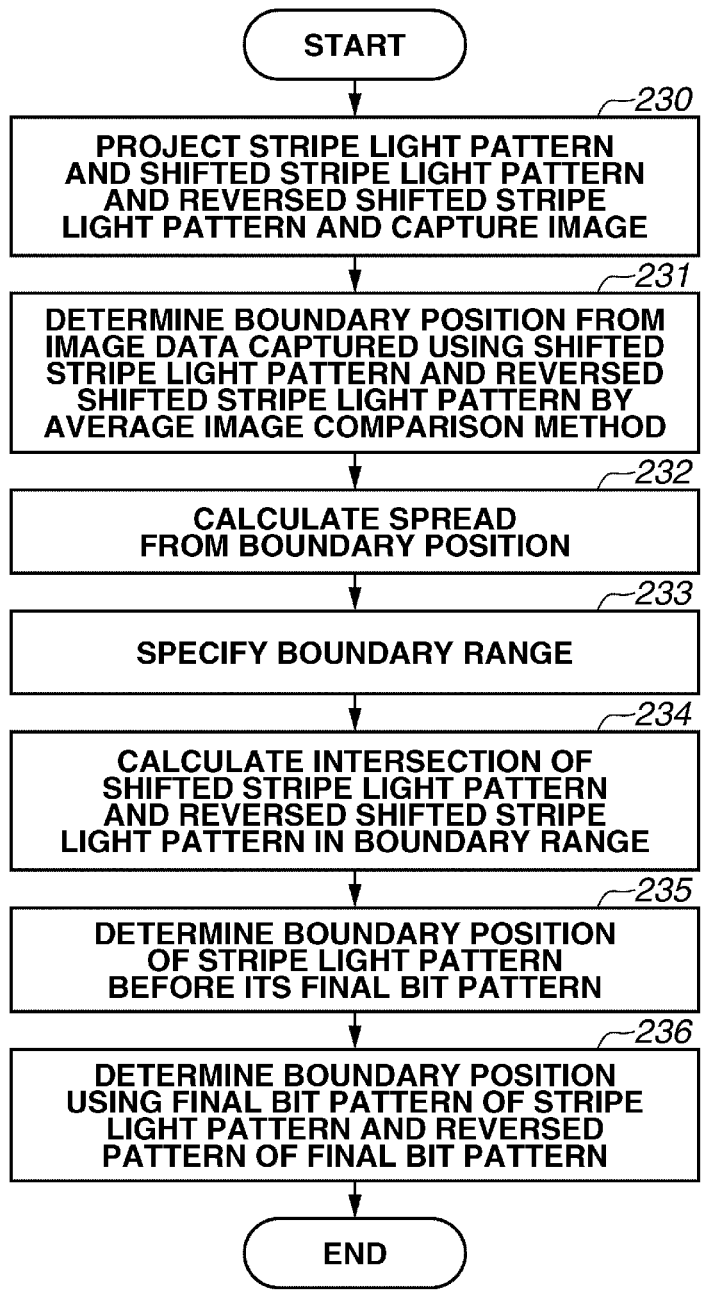
FIG. 23 illustrates a flow chart of a method for determining a boundary position according to the sixth exemplary embodiment.

The above-described flow is described in detail with reference to a flow chart illustrated in FIG. 23. The processing in the flow chart is executed by the calculation processing unit 1, the projector 12, and the camera 13.

In step S230, the N-bit spatially coded stripe light pattern 210, the N-bit reversed stripe light pattern in which the light and dark portions of the N-th bit, which is the smallest bit, stripe light pattern are reversed, the shift stripe-light pattern in which the N-th bit stripe light pattern is shifted by a predetermined period, and the reversed shift stripe-light pattern in which the light and dark portions of the shift stripe light pattern are reversed, are projected.

The object 17 onto which the light pattern is projected is captured by the camera 13. In step S231, the boundary position is determined by the average image comparison method from the image data captured using the shift stripe-light pattern and the reversed shift stripe-light pattern. In step S232, the predetermined spread is provided for the calculated boundary position. In step S233, the boundary range is specified.

In step S234, the intersection of the shift stripe-light pattern and the reversed shift stripe-light pattern is determined in the boundary range. In step S235, the calculated intersection is determined as the boundary position. Until step S235, the boundary position of the (N−1)th bit stripe light pattern can be determined.

In step S236, the intersection is determined from the Nth bit stripe light pattern and the N-bit reversed stripe light pattern to determine the boundary position of the Nth bit stripe light pattern. Thus, the boundary position between the light and dark portions of the N-bit spatially coded stripe light pattern 210 can be determined.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-176525 filed Jul. 29, 2009, which is hereby incorporated by reference herein in its entirety.

The invention claimed is:

1. A measuring apparatus comprising:
   a projection control unit configured to cause a projection unit to project, onto an object, a first pattern having a light portion and a dark portion, a second pattern having a light portion and a dark portion in which at least one of a width of the light portion and a width of the dark portion is smaller than the first pattern and a boundary position between the light portion and the dark portion of the second pattern is common to the first pattern, and a third pattern having a light portion and a dark portion in which the light portion and the dark portion of the second pattern are reversed;
   an acquisition unit configured to acquire a first captured image of the object onto which the first pattern is projected, a second captured image of the object onto which the second pattern is projected, and a third captured image of the object onto which the third pattern is projected; and
   a calculation unit configured to derive the boundary position between the light portion and the dark portion included in the first captured image based on the second and the third captured images to measure a position of the object.

2. The measuring apparatus according to claim 1, wherein each of the widths of the light portion and the dark portion included in the second captured images is a minimum distance at which the projection unit can project a pattern.

3. The measuring apparatus according to claim 1, wherein the first pattern has a plurality of light portions and a plurality of dark portions in which the respective widths of the light portions and the dark portions are equal to each other.

4. The measuring apparatus according to claim 1, wherein the first pattern includes a gray code pattern.

5. The measuring apparatus according to claim 1, wherein the first pattern includes a binary coded pattern.

6. The measuring apparatus according to claim 1, wherein the first light pattern includes a plurality of patterns where at least one of the width of the light portions and the width of the dark portions varies in the plurality of patterns,
   wherein the projection control unit causes the projection unit to separately project each of the plurality of patterns onto the object as the first pattern,
   wherein the acquisition unit acquires a plurality of captured images of the object onto each of which a different one of the plurality of patterns is projected as the first captured images, and
   wherein the calculation unit derives the boundary position between the light portion and the dark portion of each of the first captured images based on the second and the third captured images to measure the position of the object.

7. The measuring apparatus according to claim 1, wherein the calculation unit sets upper and lower luminance values of the first and the second captured images, and derives the boundary position in a luminance range between the upper and the lower luminance values.

8. The measuring apparatus according to claim 1, wherein the calculation unit derives an intermediate position of the light portion of the third captured image, and derives the boundary position based on the intermediate position.

9. The measuring apparatus according to claim 1, wherein the calculation unit derives an intersection of a straight line indicating change in luminance value of the second captured image and a straight line indicating change in luminance value of the third captured image as the boundary position.

10. The measuring apparatus according to claim 1, further comprising a distance measurement unit configured to measure a distance to the object based on the boundary position derived by the calculation unit and a positional relationship between the projection unit and the acquisition unit.

11. The measuring apparatus according to claim 1, wherein the projection control unit causes the projection unit to further project a fourth pattern with only the light portion onto the object,
    wherein the acquisition unit acquires a fourth captured image of the object onto which the fourth pattern is projected, and a fifth captured image of the object onto which a pattern is not projected by the projection unit, and
    wherein the calculation unit derives the boundary position between the light portion and the dark portion of the first captured image based on the second, the third, the fourth, and the fifth captured images to measure the position of the object.

12. The measuring apparatus according to claim 11, wherein the calculation unit obtains an average luminance value of the fourth captured image as an upper luminance value and an average luminance value of the fifth captured image as a lower luminance value, and derives the boundary position in a range between a position of an intersection of a line indicating the upper luminance value and a line indicating a change in a luminance value of the first captured image, and a position of an intersection of a line indicating the lower luminance value and the line indicating the change in the luminance value of the first captured image.

13. A measuring method comprising:
    controlling a projection unit to project, onto an object, a first pattern having a light portion and a dark portion, a second pattern having a light portion and a dark portions in which at least one of a width the light portions and a width of the dark portions is smaller than the first pattern and a boundary position between the light portion and the dark portion of the second pattern is common to the first pattern, and a third pattern having a light portion and a dark portion in which the light portion and the dark portion of the second pattern are reversed;
    acquiring, using an acquisition unit, a first captured image of the object onto which the first pattern is projected, a second captured image of the object onto which the second pattern is projected, and a third captured image of the object onto which the third pattern is projected; and
    deriving, using a calculation unit, the boundary position between the light portion and the dark portion included in the first captured image based on the second and the third captured images to measure a position of the object.

14. A non-transitory computer-readable storage medium storing a computer program for causing a computer to control a measuring apparatus to measure a position of an object, the program including instructions, comprising:
    instructions to cause a projection unit to project, onto an object, a first pattern having a light portion and a dark portion, a second pattern having a light portion and a dark portion in which at least one of a width of the light portions and a width of the dark portions is smaller than the first pattern and a boundary position between the light portion and the dark portion of the second pattern is common to the first pattern, and a third pattern having a light portion and a dark portion in which the light portion and the dark portion of the second pattern are reversed;

instructions to acquire, using an acquisition unit, a first captured image of the object onto which the first pattern is projected, a second captured image of the object onto which the second pattern is projected, and a third captured image of the object onto which the third pattern is projected; and instructions to derive, using a calculation unit, the boundary position between the light portion and the dark portion included in the first captured image based on the second and the third captured images to measure the position of the object.

15. A measuring apparatus comprising:

a projection control unit configured to cause a projection unit to project, onto an object, each of a plurality of patterns having a light portion and a dark portion where at least one of a width of the light portions and a width of the dark portions varies in the plurality of patterns, a second pattern having a light portion and a dark portion in which the light portion and the dark portion of a first pattern, which is smallest in at least one of the width of the light portion and the width of the dark portion in the plurality of patterns, are reversed to each other, a third pattern obtained by shifting the second pattern with respect to the first pattern by a predetermined period and making the width of the light portion and the width of the dark portion equal to each other, and a fourth pattern in which the light portion and the dark portion of the third pattern are reversed to each other;

an acquisition unit configured to acquire a plurality of captured images of the object onto which each of a different one of the plurality of patterns is projected, a second captured image of the object onto which the second pattern is projected, a third captured image of the object onto which the third pattern is projected, and a fourth captured image of the object onto which the fourth pattern is projected; and a calculation unit configured to derive a boundary position between the light portion and the dark portion included a first captured image of the object onto which the first pattern is projected among the plurality of captured images based on the second captured image, and derives the boundary positions between the light portion and the dark portion of the plurality of captured images other than the first captured image based on the third and the fourth captured images so as to measure a position of the object.

16. The measuring apparatus according to claim 15, wherein the third pattern is obtained by shifting the second pattern with respect to the first pattern by a period of ¼+N in a horizontal direction and making the width of the light portion and the width of the dark portion equal to each other.

17. A measuring apparatus comprising:

a projection control unit configured to cause a projection unit to project, onto an object, a first pattern having a light portion and a dark portion, a second pattern having a light portion and a dark portion in which at least one of a width of the light portion and a width of the dark portion is smaller than the first pattern, and a third pattern in which the light portion and the dark portion of the second pattern are reversed to each other;

an acquisition unit configured to acquire a first captured image of the object onto which the first pattern is projected, a second captured image of the object onto which the second pattern is projected, and a third captured image of the object onto which the third pattern is projected; and a measurement unit configured to measure a position of the object based on the first, the second and the third captured images, wherein the acquisition unit captures an image in an order of the first, the second, and the third captured images.

18. A measuring apparatus comprising:

a projection control unit configured to cause a projection unit to project, onto an object, a plurality of patterns having a light portion and a dark portion, where at least one of a width of the light portion and a width of the dark portion varies in the plurality of patterns, a second pattern in which each of a light portion and a dark portion has a width equal to the smallest width among the widths of the respective light portion and dark portion of the plurality of patterns, and a third pattern obtained by reversing only the light portion and the dark portion of the second pattern;

an acquisition unit configured to acquire a plurality of captured images of the object onto which each of a different one of the plurality of patterns is projected, a second captured image of the object onto which the second pattern is projected, and a third captured image of the object onto which the third pattern is projected; and a calculation unit configured to derive a three-dimensional shape of the object based on the plurality of captured images, the second captured image, and the third captured image.

19. The measuring apparatus according to claim 18, wherein the plurality of patterns includes a binary coded pattern.

20. The measuring apparatus according to claim 18, wherein the plurality of patterns includes a gray code pattern.

21. A measuring method comprising:

controlling a projection unit to project, onto an object, each of a plurality of patterns having a light portion and a dark portion where at least one of a width of the light portions and a width of the dark portion varies in the plurality of patterns, a second pattern having a light portion and a dark portion in which the light portion and the dark portion of a first pattern, which is smallest in at least one of the width of the light portion and the width of the dark portion in the plurality of patterns, are reversed to each other, a third pattern obtained by shifting the second pattern with respect to the first pattern by a predetermined period and making the width of the light portion and the width of the dark portion equal to each other, and a fourth pattern in which the light portion and the dark portion of the third pattern are reversed to each other;

acquiring, using an acquisition unit, a plurality of captured images of the object onto which each of a different one of the plurality of patterns is projected, a second captured image of the object onto which the second pattern is projected, a third captured image of the object onto which the third pattern is projected, and a fourth captured image of the object onto which the fourth pattern is projected; and deriving, using a calculation unit, a boundary position between the light portion and the dark portion included in a first captured image of the object onto which the first pattern is projected among the plurality of captured images based on the second captured image, and the boundary positions between the light portion and the dark portion included in the plurality of captured images other than the first captured image based on the third and the fourth captured images so as to measure a position of the object.

22. A non-transitory computer-readable storage medium storing a computer program for causing a computer to control a measuring apparatus to measure a position of an object, the program including instructions comprising:

instructions to control a projection unit to project, onto an object, each of a plurality of patterns having a light portion and a dark portion where at least one of a width of the light portion and a width of the dark portion varies in the plurality of patterns, a second pattern having a light portion and a dark portion in which the light portion and the dark portion of a first pattern, which is smallest in at least one of the width of the light portion and the width of the dark portion in the plurality of patterns, are reversed to each other, a third pattern obtained by shifting the second pattern with respect to the first pattern by a predetermined period and making the width of the light portion and the width of the dark portion equal to each other, and a fourth pattern in which the light portion and the dark portion of the third pattern are reversed to each other;

instructions to acquire, using an acquisition unit, a plurality of captured images of the object onto which each of a different one of the plurality of patterns is projected, a second captured image of the object onto which the second pattern is projected, a third captured image of the object onto which the third pattern is projected, and a fourth captured image of the object onto which the fourth pattern is projected; and instructions to derive, using a calculation unit, a boundary position between the light portion and dark portion included in a first captured image of the object onto which the first pattern is projected among the plurality of captured images based on the second captured image, and the boundary positions between the light portion and the dark portion included in the plurality of captured images other than the first captured image based on the third and the fourth captured images so as to measure a position of the object.

23. A measuring method comprising:

controlling a projection unit to project, onto an object, a first pattern having a light portion and a dark portion, a second pattern in which at least one of a width of the light portion and a width of the dark portion is smaller than the first pattern, and a third pattern in which the light portion and the dark portion of the second pattern are reversed to each other;

acquiring, using an acquisition unit, a first captured image of the object onto which the first pattern is projected, a second captured image of the object onto which the second pattern is projected, and a third captured image of the object onto which the third pattern is projected; and measuring, using a measurement unit, a position of the object based on the first, the second and the third captured images, wherein, in the acquiring, the acquisition unit captures an image in an order of the first, the second, and the third captured images.

24. A non-transitory computer-readable storage medium storing a computer program for causing a computer to control a measuring apparatus to measure a position of an object, the program including instructions comprising:

instructions to control a projection unit to project, onto an object, a first pattern having a light portion and a dark portion, a second pattern in which at least one of a width of the light portion and a width of the dark portion is smaller than the first pattern, and a third pattern in which the light portion and the dark portion of the second pattern are reversed to each other;

instructions to acquire, using an acquisition unit, a first captured image of the object onto which the first pattern is projected, a second captured image of the object onto which the second pattern is projected, and a third captured image of the object onto which the third pattern is projected; and instructions to measure, using a measurement unit, a position of the object based on the first, the second and the third captured images, wherein, the instructions to acquire include instructions to capture, using the acquisition unit, an image in an order of the first, the second, and the third captured images.

25. A measuring method comprising:

controlling a projection unit to project, onto an object, a plurality of patterns having a light portion and a dark portion, where at least one of a width of the light portion and a width of the dark portion varies in the plurality of patterns, a second pattern in which each of a light portion and a dark portion has a width equal to the smallest width among the widths of the respective light portion and dark portion of the plurality of patterns, and a third pattern obtained by reversing only the light portion and the dark portion of the second pattern;

acquiring, using an acquisition unit, a plurality of captured images of the object onto which each of a different one of the plurality of patterns is projected, a second captured image of the object onto which the second pattern is projected, and a third captured image of the object onto which the third pattern is projected; and deriving, using a calculation unit, a three-dimensional shape of the object based on the plurality of captured images, the second captured image, and the third captured image.

26. A non-transitory computer-readable storage medium storing a computer program for causing a computer to control a measuring apparatus to measure a position of an object, the program including instructions comprising:

instructions to control a projection unit to project, onto an object, a plurality of patterns having a light portion and a dark portion, where at least one of a width of the light portion and a width of the dark portion varies in the plurality of patterns, a second pattern in which each of a light portion and a dark portion has a width equal to the smallest width among the widths of the respective light portion and dark portion of the plurality of patterns, and a third pattern obtained by reversing only the light portion and the dark portion of the second pattern;

instructions to acquire, using an acquisition unit, a plurality of captured images of the object onto which each of a different one of the plurality of patterns is projected, a second captured image of the object onto which the second pattern is projected, and a third captured image of the object onto which the third pattern is projected; and instructions to derive, using a calculation unit, a three-dimensional shape of the object based on the plurality of captured images, the second captured image, and the third captured image.

* * * * *